(12) United States Patent
Francoeur

(10) Patent No.: US 10,659,489 B2
(45) Date of Patent: May 19, 2020

(54) SYSTEM AND METHOD FOR EVALUATING AND ENHANCING THE SECURITY LEVEL OF A NETWORK SYSTEM

(71) Applicant: Security Inclusion Now USA LLC, Carnelian Bay, CA (US)

(72) Inventor: Jacques Remi Francoeur, Los Gatos, CA (US)

(73) Assignee: Security Inclusion Now USA LLC, Carnelian Bay, CA (US)

(*) Notice: Subject to any disclaimer, the term of this patent is extended or adjusted under 35 U.S.C. 154(b) by 0 days.

(21) Appl. No.: 15/934,485

(22) Filed: Mar. 23, 2018

(65) Prior Publication Data
US 2018/0288088 A1 Oct. 4, 2018

Related U.S. Application Data

(63) Continuation of application No. 15/611,495, filed on Jun. 1, 2017, now Pat. No. 10,116,682, which is a continuation of application No. 15/041,923, filed on Feb. 11, 2016, now Pat. No. 9,699,208, which is a continuation of application No. 14/148,685, filed on Jan. 6, 2014, now Pat. No. 9,294,495.

(60) Provisional application No. 61/749,357, filed on Jan. 6, 2013.

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01)

(58) Field of Classification Search
CPC combination set(s) only.
See application file for complete search history.

(56) References Cited

U.S. PATENT DOCUMENTS

| | | | |
|---|---|---|---|
| 8,176,561 B1 | 5/2012 | Hurst et al. | |
| 2003/0084349 A1* | 5/2003 | Friedrichs | G06F 21/55 726/22 |
| 2003/0105859 A1 | 6/2003 | Garnett | |
| 2006/0129810 A1 | 6/2006 | Jeong et al. | |
| 2007/0250525 A1 | 10/2007 | Sanghvi | |
| 2008/0209506 A1 | 8/2008 | Ghai | |
| 2008/0262985 A1 | 10/2008 | Cretu | |
| 2009/0007272 A1* | 1/2009 | Huang | G06F 21/57 726/26 |
| 2009/0178132 A1 | 7/2009 | Hudis | |
| 2009/0254993 A1* | 10/2009 | Leone | G06F 21/51 726/25 |

(Continued)

OTHER PUBLICATIONS

Wang et al. Measuring and Ranking Attacks Based on Vulnerability. Information Systems and e-Business Management, vol. 10, Issue 4, pp. 455-490 [online], Dec. 2012 [retrieved Jul. 6, 2019]. Retrieved from the Internet < URL https: // rd.springer . com/ article /10.1007 /s10257-011-0173-5 > (Year: 2012).*

*Primary Examiner* — Malcolm Cribbs
(74) *Attorney, Agent, or Firm* — Mahamedi IP Law LLP

(57) ABSTRACT

Examples described herein provide for a system that evaluates a security level of a network system. Additionally, examples described herein evaluate a security level of a network system in order to enable a determination of components that can be used to enhance the security level of the network system.

17 Claims, 13 Drawing Sheets

(56) References Cited

U.S. PATENT DOCUMENTS

| | | |
|---|---|---|
| 2010/0275263 A1 | 10/2010 | Bennett |
| 2011/0093916 A1* | 4/2011 | Lang ................. G06F 21/57 |
| | | 726/1 |
| 2011/0277034 A1 | 11/2011 | Hanson |
| 2012/0089664 A1 | 4/2012 | Igelka |
| 2012/0110671 A1 | 5/2012 | Beresnevichiene |
| 2012/0185944 A1 | 7/2012 | Abdine et al. |
| 2013/0031037 A1 | 1/2013 | Brandt |
| 2013/0031595 A1* | 1/2013 | Nevstruev ........... G06F 21/6245 |
| | | 726/1 |
| 2013/0104236 A1 | 4/2013 | Ray |
| 2014/0007241 A1 | 1/2014 | Gula |
| 2014/0082733 A1* | 3/2014 | Benefield ............ G06F 21/577 |
| | | 726/25 |
| 2014/0173737 A1* | 6/2014 | Toback ................ G06F 21/577 |
| | | 726/25 |
| 2014/0189873 A1* | 7/2014 | Elder ................. H04L 63/1433 |
| | | 726/25 |
| 2014/0366085 A1 | 12/2014 | Lang |

\* cited by examiner

SYSTEM AND METHOD FOR EVALUATING AND ENHANCING THE SECURITY LEVEL OF A NETWORK SYSTEM

RELATED APPLICATIONS

This application is a continuation of U.S. patent application Ser. No. 15/611,495 filed Jun. 1, 2017, which is a continuation of Ser. No. 15/041,923 filed Feb. 11, 2016, now U.S. Pat. No. 9,699,208, which is a continuation of U.S. patent application Ser. No. 14/148,685 filed Jan. 6, 2014, now U.S. Pat. No. 9,294,495, which claims the benefit of U.S. Provisional Patent Application No. 61/749,357; filed Jan. 6, 2013; the aforementioned priority applications being hereby incorporated by reference in their respective entirety and for all purposes.

TECHNICAL FIELD

Examples described herein relate to a system and method for evaluating a security level of a network system.

BACKGROUND

Cyber threats to enterprise networks are a very real and expensive risks to proprietors. It is typical for enterprise networks to operate numerous kinds of equipment and technology (e.g., wireless network, Intranet), each of which has its own particular set of security issues, solutions and complexities. The result is that the collective security issues that face proprietors of enterprise networks are overwhelming, making intelligent and optimized decisions on how to plan, fund and implement security enhancements difficult.

DETAILED DESCRIPTION

Figure 1:
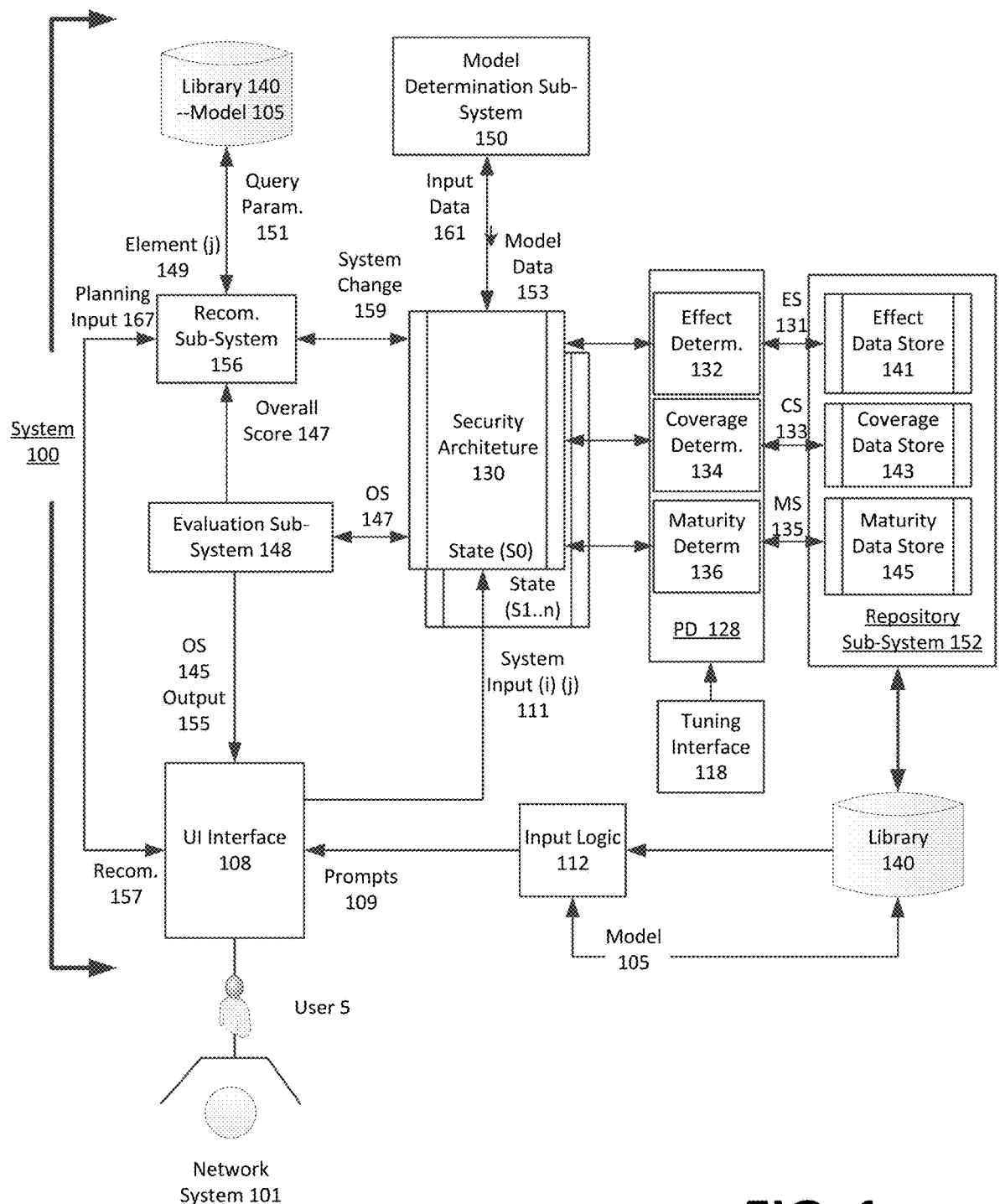
FIG. 1 illustrates a system for evaluating and enhancing a security level of a network system, according to one or more embodiments.

Examples described herein provide for a system that evaluates a security level of a network system. Additionally, examples described herein evaluate a security level of a network system in order to enable a determination of components that can be used to enhance the security level of the network system.

Among other benefits, examples described herein enable various kinds of users for a network system (e.g., administrator, manager, executive) to analyze and understand the security level of their particular network system, particularly as to their network system's exposure to specific threats and the assets that can be exposed by such threats. Embodiments such as described herein further enable such users to model their current and prospective (or future) security architecture, particularly as to variations and enhancements that can be made to the network system in order to enhance the network system's security level. The modeling of the security architecture for future developments enables the user to make intelligent and optimal decisions that accommodate short and long term budgets.

In an embodiment, a computer system operates to identify a plurality of security elements of the network system. A security architecture for the network system is determined based on the identified security elements. The processor determines the security architecture by implementing a security model. The security model identifies a plurality of pre-determined relationships as between the identified security elements, in connection with possible types of threats to the network system and assets that can be exposed as a result of a breach. The security architecture can be evaluated to determine an evaluation for the network system. The evaluation can be outputted to the user.

In some variations, the security model can be used to build prospective or future security architectures, for purpose of enabling the user to enhance the security level of the network system.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs, or a computer usable carrier medium capable of carrying such a program.

System Description

FIG. 1 illustrates a system for evaluating and enhancing a security level of a network system, according to one or more embodiments. A network system 101 can correspond to, for example, an enterprise network, or other defined network including resources and assets that are to be protected from external and internal threats. A security evaluation and enhancement system 100 (alternatively referred to as security evaluation system 100 or system 100) such as described with FIG. 1 can be implemented as a separate system or entity from the network system 101 that is being evaluated and enhanced. By way of example, the security evaluation system 100 can be provided as part of a network service that receives input from a user 5 of an enterprise network. The user 5 can correspond to, for example, a manager, executive, administrator or practitioner of the network system 101.

Examples such as described with FIG. 1 recognize that different network systems have varying security level needs. In particular, an acceptable exposure level of a network system can be based in part on the cost or liability to the operator of the network system in the event of a security breach. For example, the exposure risk of a network system that retains highly confidential information can be less than the exposure risk to a network system that maintains less confidential information.

In an embodiment, the security evaluation system 100 can receive input from the user 5 for a particular network system, and provide output that includes an evaluation of the security level for the particular network system in its current state. As an addition or alternative, the evaluation system 100 can determine recommendations for the operator of the network system in order to improve the security level of the network. Thus, the security evaluation system 100 can determine the security level of a given network system using alternative security components than those employed. Additionally, the security evaluation system 100 can generate recommendations for alternative security components and configurations based at least partially on cost considerations and/or security risks. Among other benefits, the security evaluation system 100 can generate recommendations for a network system that is optimized to account for cost and/or risk level. Still further, in some implementations, the security evaluation system 100 can implement cost and technology and implementation and planning measures (e.g., using multi-year budget).

In greater detail, system 100 can include a user interface 108, input logic 112, and an inventory library 140. The inventory library 140 stores information about security components available for enterprise networks as a whole. The components described in the inventory library can include commercially-available components, with information obtained and derived from vendor-provided information. Such information can include performance and pricing benchmarks provided by third-parties (including vendors). In this respect, the library 140 can reflect a collection of information provided through vendor and/or third-party sources regarding numerous types of components that can be employed by, for example, information technology (IT) networks (e.g., enterprise networks). The information for the inventory library 140 can be pre-determined using, for example, expert resources. As described further, the inventory library 140 can include relationships and metrics that are based on a defined security model 105. Various kinds of security models can be employed with a system such as described with FIG. 1. For example, the security model 105 can be represented through a data structure that is iteratively developed. Still further, some embodiments provide for a security model that includes a defined library of elements, arranged so that elements have relationships and interdependencies with one another. Still further, some embodiments such as described with examples of FIG. 3A through FIG. 3G can implement a security model as a multi-dimensional spherical structure.

The input logic 112 can operate to generate prompts 109 that are communicated to the user 5 via the user interface 108. The prompts 109 can be structured to guide the user 5 to provide information for determining the security level of the network system. In one embodiment, the input logic 112 operates to generate prompts 109 to provide information for building a user's security architecture in accordance with the model 105. Among other benefits, the security model 105 can be implemented to normalize security metrics across different aspects of the network, and further to identify weaknesses and/or recommendations for improvements to the network system that implicate the security level of the network system as a whole.

The user 5 of the network system can provide the system input 111 through the user interface 108. The system input 111 can reflect a past, current or future state of the network system. In implementation, when evaluation is initiated, the user 5 can be prompted for information to determine the current state of the network system 101. The current state of the network system can be determined from system input 111 at state (S=0) (current time). The system input 111 can be stored in accordance with the model 105, to define a security architecture 130 of the network system 101. In this way, the security architecture 130 can be based on the model 105, as populated or otherwise configured with data specific to the network system 101.

A model determination sub-system 150 can implement processes to use input data 161 from the user 5 (e.g., data that correlates to system input 111) to further extrapolate or determine additional information in accordance with the security model 105. The model determination sub-system 150 can generate model data 153 that forms part of the security architecture 130. The model data 153 can describe a given state of the network system using input provided by the user 5, and further in accordance with the security model 105.

In determining the model data 153, the model determination sub-system 150 can access and use the inventory library 140. In one implementation, the inventory library 140 can be structured and provided with relationship data in accordance with the model 105, and the model determination sub-system 150 can utilize the structured information of the inventory library 140 in order to extrapolate and build upon information provided by the user 5 as system input 111. In this way, security architecture 130 can include data that is structured in accordance with the security model 105.

With further reference to FIG. 1, a parametric determination sub-system 128 can evaluate the current state of the network system from security architecture 130. The parametric determination sub-system can determine parameters for the system architecture 130, which can be stored with one or more data stores of a repository sub-system 152. In an example of FIG. 1, the parametric determination sub-system 128 can include an effective determination process 132, a coverage determination process 134 and/or a maturity determination process 136. The effective determination process 132 can identify or analyze components of the network system, as structured in accordance with the security model 105, in order to determine an effectiveness score 131 of different components of the network system. In one implementation, the effective determination process 132 can prompt the user for input that directly or indirectly correlates to effectiveness score 131. The user 5 can provide input that correlates to the effectiveness score 131, and this value can be stored with an effectiveness data store 141 of the repository sub-system 152.

As a variation, the effective determination process 132 can cross-reference an element of the network system (as defined by the security model 105) with an effectiveness data store 141. For example, the effectiveness data store 141 of the repository sub-system 152 can be used to store the effectiveness score 131 for use in potential future states of the security architecture 130. The effectiveness data store 141 can store information that correlates elements of the security architecture to current or future values of the effectiveness score 131. The current and future values stored by the effectiveness data store 141 can be used to enable the operator to make planning determinations and/or compare security architectures (e.g., current versus potential future) based on the particular parameter.

Still further, the parametric determination sub-system 128 can programmatically measure the effectiveness of some or all of the elements. As another variation, the parametric determination sub-system 128 can programmatically validate the effectiveness of some or all of the elements. The effective determination process 132 can update the security architecture 130 by outputting the effectiveness score 131 (e.g., storing the effectiveness score 131 in the effectiveness data store 141 of the repository sub-system 152) for security components and other aspects of the network system.

Similarly, the coverage determination process 134 can analyze components of the network system, as structured in accordance with the security model 105, in order to determine a coverage score 133 for different aspects of the network system 101. The coverage score 133 reflects how the same component evaluated for effectiveness is now evaluated for whether it is present everywhere the component is needed within the network system 101. In one implementation, the coverage determination process 134 can prompt the user for input that directly or indirectly correlates to coverage score 133. The determined coverage score 133 can be stored in a coverage data store 134 of the repository sub-system 152.

In determining the coverage score 133, the coverage determination process 134 can also cross-reference individual elements of the security architecture 130 with a coverage data store 143. For example, the coverage data store 143 of the repository sub-system 152 can be used to store the coverage score 133 for use in potential future states of the security architecture 130. The coverage data store 143 can store information that correlates to the coverage score 133 for numerous elements of a security system. The current and future values stored by the coverage data store 143 can be used to enable the operator to make planning determinations and/or compare security architectures (e.g., current versus potential future) based on the coverage parameter.

Still further, the parametric determination sub-system 128 can programmatically measure the coverage of some or all of the elements. As another variation, the parametric determination sub-system 128 can programmatically validate the coverage of some or all of the elements. The coverage determination process 134 can update the security architecture 130 by outputting coverage score 133 for security components and other aspects of the network system.

Additionally, as in the case of effectiveness and coverage determination, the maturity determination process 136 assesses the support resources (e.g., processes, software patches, documentation, expert support, third-party adoption) available for individual components of the network system, as structured in accordance with the security model 105. The maturity determination process 136 determines a maturity score 135 that reflects the support available of the network system 101. In this way, the maturity score 135 reflects the extent and quality of the support resources for individual security elements of the network system, with the basis that components of lower maturity contribute only a portion of the overall potential protection that can be derived from the component. In determining the maturity score 135, the maturity determination process 136 can process input from the user that is indicative of a quality of the support resources for the individual element.

In a variation, the maturity score 135 for some or all of the elements can be determined by cross-referencing individual elements of the security architecture 130 with a maturity data store 145. For example, the maturity data store 145 of the repository sub-system 152 can be used to store the maturity score 135 for use in future states of the security architecture 130. The maturity data store 145 can store information that correlates to the maturity score 135 for numerous elements of a security system. The maturity determination process 136 can update the security architecture 130 by outputting maturity score 135 for security components and other aspects of the network system. Additionally, the current and future values stored by the maturity data store 145 can be used to enable the operator to make planning determinations and/or compare security architectures (e.g., current versus potential future) based on the particular parameter.

According to some embodiments, the parameters determined by the parametric determination sub-system 128 (e.g., effectiveness, coverage or maturity) can correspond to a numeric value that indicates whether a particular element is present in the security architecture 130. By way of example, the parametric values can reflect (i) the element being not present, (e.g., "0" in binary value scheme), (ii) the element being present, (e.g., "1" in binary value scheme) and/or (iii) the element being present and weighted to emphasize or discount the presence. In some implementations, a parameter for an element can be weighted by for example, the user 5 of the network system 101. For example, the parametric determination sub-system 128 can be provided with a tuning interface 118, which enables the user to tune parameters generated by the parametric determination sub-system 128. By way of example, the tuning interface 118 applies mathematical computations such as a weighting on specific parameters for elements of network system 101. The tuning interface 118 can be provided through, for example, the user interface 108. The weighting can enable the user 5 to customize how the system 100 representing their respective network system responds to the element values, to emphasize or de-emphasize certain elements and respective characteristics relating to, for example, effectiveness, coverage or maturity. In addition, the tuning interface 118 allows the associations and relationships between elements to be or programmed providing the ability to control and optimize the system response.

An evaluation sub-system 148 can process the security architecture 130 for a particular state of the network system.

For a given state (e.g., current state (S=0)), the evaluation sub-system 148 performs an evaluation that utilizes scores provided by the parametric determination sub-system 128. For example, the evaluation sub-system 148 can operate to aggregate and evaluate the security level of the network system based on the effectiveness score 131, the coverage score 133 and the maturity score 135. By way of example, the evaluation sub-system 148 can determine an overall score 147 for the network system based on a mathematical computation, such as a weighted average or aggregation of the effectiveness score 131, coverage score 133 and/or maturity score 135. In one implementation, overall score 147 can be communicated to the user 5 via the user interface 108 as part of an output 155. The output 155 can include additional content, such as recommendations or visual renditions of the security architecture 130 (see FIG. 5A through FIG. 5D). As a variation, the scoring of the evaluation sub-system 148 can be implemented on categories or aspects of the security system. For example, the evaluation sub-system 148 can aggregate the scoring of individual components of the security system, and provide results that reflect aggregate scoring for different aspects or categories of the network system.

As an addition or alternative, the evaluation sub-system 148 can determine aggregate scores that quantify a particular category or aspect of the overall security level. By way of example, the evaluation sub-system 148 can determine the ability of the network system to sustain a particular kind of attack. Still further, the evaluation sub-system 148 can determine an aggregate score for the network system as a whole, based on individual metrics such as effectiveness, coverage or maturity. In one implementation, the evaluation sub-system 148 can determine aggregates for one or more of an effectiveness score, coverage score, or maturity score, for either the system as a whole, or categories or aspects of the security system individually.

In some embodiments, the system 100 includes a recommendation sub-system 156 to identify changes that can be made to security aspects of the network system. Generally, the recommendation sub-system 156 can generate a set of recommendations 157 that identify security improvements to the network system. The recommendation sub-system 156 can generate a query 151 that specifies a parameter (or set of parameters) in order to identify a set of elements (j) 149 that may improve the security level of the network system. The set of elements 149 can be communicated to the user 5 via the user interface 108 as recommendations 157. Additionally, the set of elements 149 can be communicated as a system change 159 for the security architecture 130. The system changes 159 can be determined directly or indirectly (e.g., from the user 5, as system input 111 for future states (S=1, 2 . . . n)) for the security architecture 130. As described with other examples, the system changes 159 can be used to determine enhancements for the security architecture 130.

More specifically, in some embodiments, the recommendation sub-system 156 can provide system changes 159 to generate a prospective or future state of the network system. The system changes 159 can be recorded as for example, a future state (S=1 . . . n) of the network system. The future state of the security system can be re-evaluated, so that the effect of the change or addition to the network system as a whole can be determined. The evaluation of the future state of the security architecture 130 can include comparing stored parameters for the current state and one or more future states. The stored parameters can be provided by the repository sub-system 152. For example, the evaluation of a given future state for security architecture 130 can include comparisons of the effectiveness score 131 (stored in effectiveness data store 141), coverage score 133 (stored in coverage data store 143), and/or maturity score 135 (stored in maturity data store 145), as between current and future state(s) of the security architecture 130. For example, the security architecture 130 can receive information from the recommendation sub-system 156, and the future state can be analyzed and scored for effectiveness, coverage and maturity, using components of the parametric determination sub-system 128.

In some embodiments, the recommendation sub-system 156 receives planning input 167 from the user 5. The planning input 167 can include, for example, a budget, or extended (e.g., multi-year) budget. Additionally, the planning input 167 can specify acceptable security levels (e.g., exposure levels). The planning input 167 can specify required security levels for specific types of risks threats, or specify security measures for some assets and not others. The recommendation sub-system 156 can implement an optimization process that updates the state of the network system to determine prospective elements for the security system to optimize cost. The optimization process can seek an optimal improvement to the security level of the network system that achieves an adequate level of protection that results in an acceptable level of exposure or risk. The optimization process implemented by the recommendation sub-system 156 can query 151 the library 140 with parameters that specify cost and effectiveness (or other security measure) at an acceptable security or exposure level (e.g., as specified by the planning input 167). Identified components and elements for the network system can be added to the system information, and the effects of the addition can be evaluated by the parametric determination sub-system 128 and/or evaluation sub-system 148 to determine if the security level is at an acceptable level.

Methodology

Figure 2A:
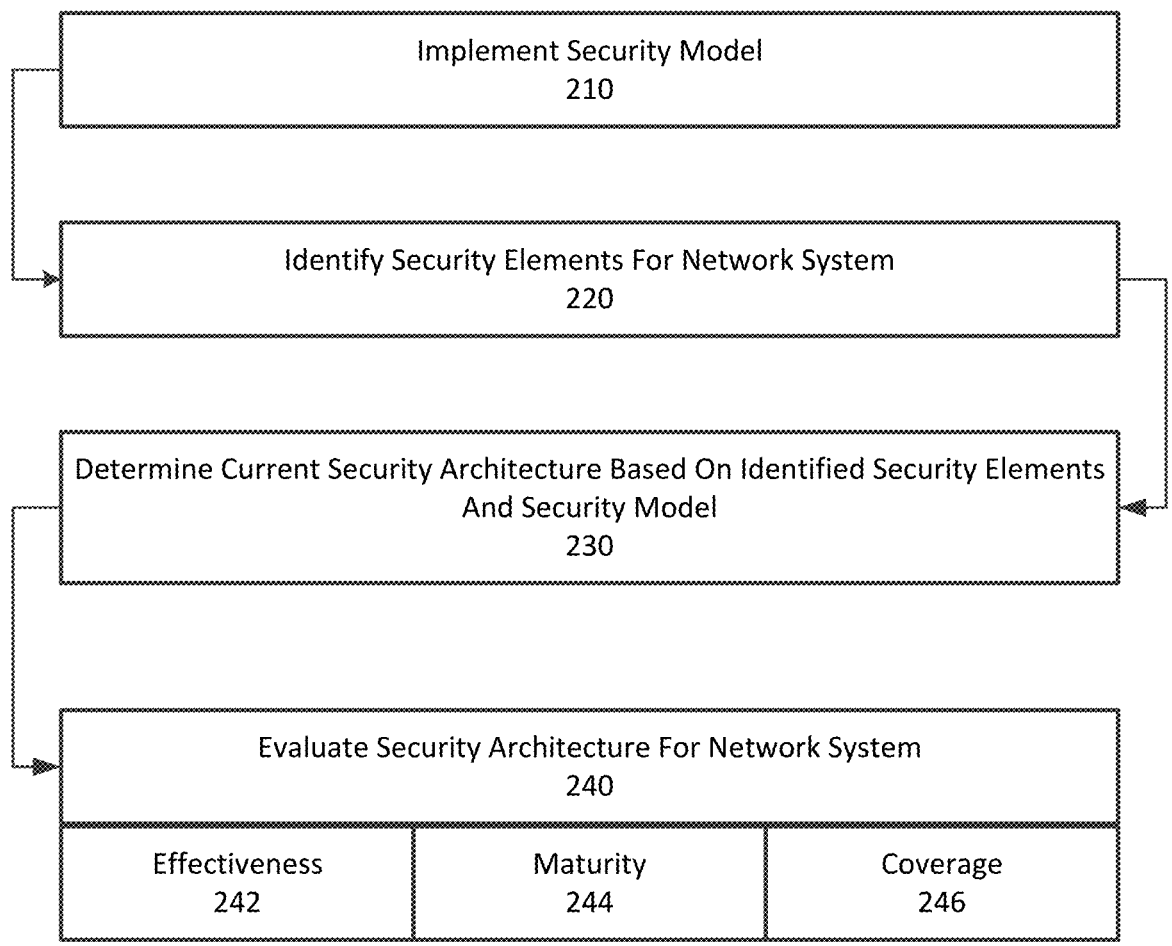
FIG. 2A illustrates a method for evaluating the security level of a network system, according to an embodiment.
Figure 2B:
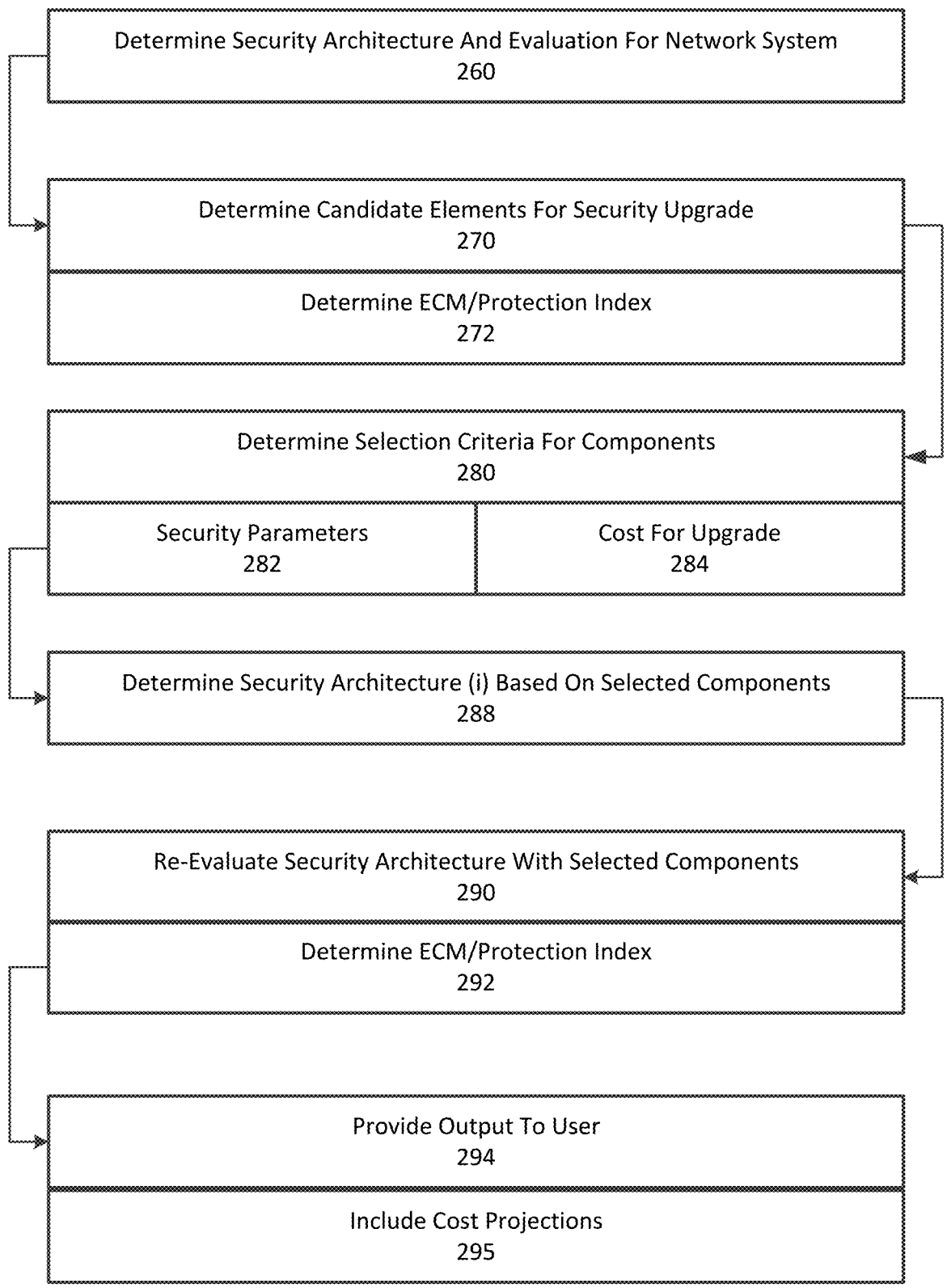
FIG. 2B illustrates a method for evaluating a security level of a network system for purpose of determining improvements that can be made to a network system in order to increase a security level of the network system, according to an embodiment.
Figure 2C:
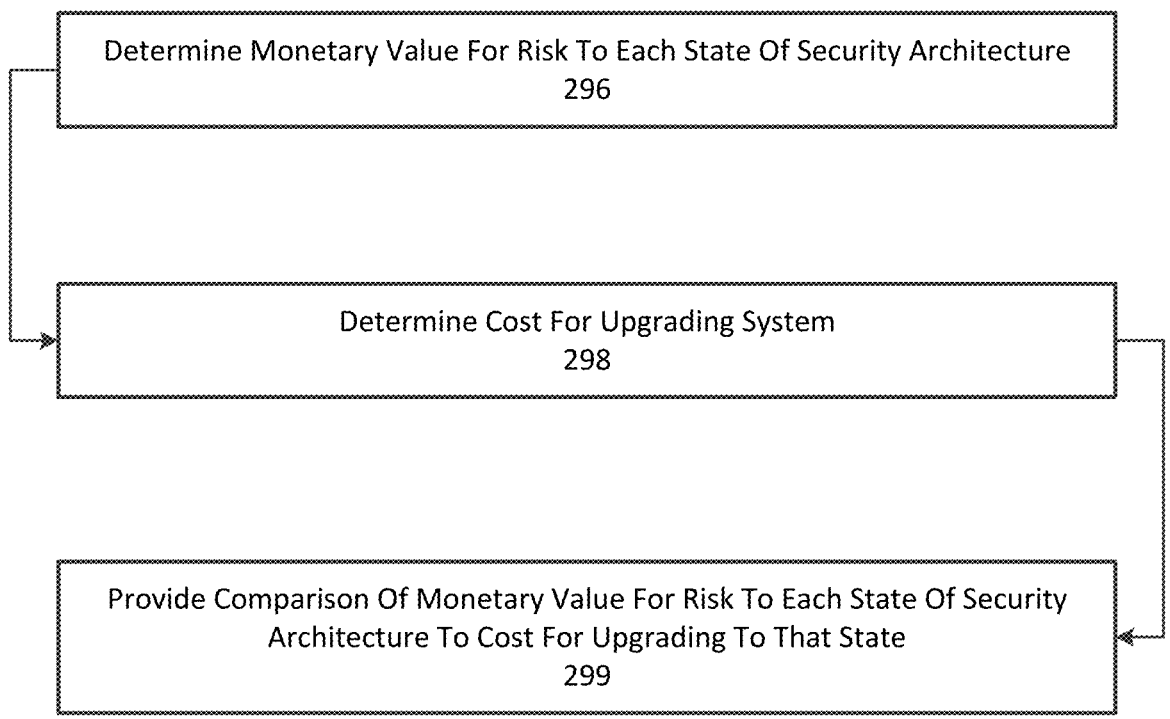
FIG. 2C illustrates a method for using cost-analysis to determine whether a particular improvement to a security architecture of a network system is financially merited, according to an embodiment.

FIG. 2A illustrates a method for evaluating the security level of a network system, according to an embodiment. FIG. 2B illustrates a method for evaluating a security level of a network system for purpose of determining improvements that can be made to a network system in order to increase a security level of the network system, according to an embodiment. FIG. 2C illustrates a method for using cost-analysis to determine whether a particular improvement to a security architecture of a network system is financially merited, according to an embodiment. In describing an example of FIG. 2A, FIG. 2B or FIG. 2C, reference may be made to elements of FIG. 1 for purpose of describing suitable elements or components for performing a step or sub-step being described.

With reference to FIG. 2A, a security model is defined for use in determining a security architecture of a network system (210). The security model represents a predefined data structure, as well as data and functionality that correlates security components of a network system 101 into elements that have a pre-defined set of relationships with other defined elements of the security model. The security model can establish elements and their respective relationships based on types of threats, as well as types of assets that are to be protected. According to some embodiments, the security model is structured as a multi-dimensional set of concentric spheres, defining spaces and domains within a security paradigm of a network system. As described with examples of FIG. 3A through FIG. 3G, the security model includes spaces for defining elements that represent assets, security components, and threats. The security model can thus correlate components of a network system into a holistic and interdependent set of elements that have varying degrees of specificity and relationships. In this way, the security model provides a structure that can provide clarity as to the security level of a given network system against different kinds of cyber threats.

With reference to an example of FIG. 1, the security model 105 can be defined within various components of the security evaluation system 100. Additionally, in some variations, the model 105 can also be used to structure various data resources, including library 140.

The security elements for network systems can be identified based on the security model 105 (220). In some embodiments, identification of security elements for the security model includes prompting the user into entering input that can identify specific components that relate to the security of the network system. The component can correspond to, for example, a specific device or module, a programmatic component, a process, a protocol or other identifiable entity that resides on the security network system. On one level, some elements of the security model can be determined by correlating components identified by the user to predetermined elements. Still further, other elements can be determined from extrapolating information determined from one or more components that are specified by the user. For example, the user may be aware of the components that are deployed on a network system, but the determination of some or all of the elements may be based on correlating and extrapolating the user input.

With reference to FIG. 1, the input logic 112 can be used to generate prompts 109 which guide the user into providing structured input that can be separately correlated to elements of the security model. Accordingly, the input logic 112 can be based on the particular security model 105. In an example of FIG. 1, the model determination sub-system 150 can implement the security model 105, including determining elements of the security architecture 130 from the user input.

A current security architecture for the network system can be determined from the identified security elements and the implemented security model (230). With reference to an example of FIG. 1, the security architecture 130 can implement or incorporate values based on the security model and the system input 111 of the user. In particular, the individual elements of the security model 105 can reflect information that identifies whether the particular element is present. Alternatively, the individual elements of the security model can reflect information that indicates the effectiveness, coverage, and maturity of the particular element. As an addition or alternative, information provided by the user can also identify the type of element, and/or existence of relationships to other elements. Thus, for example, the security architecture 130 of FIG. 1 can reflect the security model as applied to the particular network system 101 and the identified component.

The security architecture 130 for a network system can be evaluated (240). In particular, a set of parametric determinations can be based on parameters that are deemed relevant to the security against cyber threats. In one implementation, the parameters can reflect a variable classification that can be applied to be descriptive of the security level of each element in the security architecture. In an example of FIG. 1, the set of parametric determinations can be stored as part of the security architecture 130. The parametric determination sub-system 128 can, for example, determine a set of parameters for evaluating and/or enhancing the security architecture 130.

In one implementation, the security architecture 130 can reflect parametric determinations that are based on an effectiveness parameter (242). The effectiveness parameter can reflect a measure of how effective a particular element is against threats it is designed to mitigate. As an addition or alternative, the parametric determinations can be based on a maturity parameter (244), which reflects a determination as to the quality of the support resources for individual elements of the security architecture 130. Still further, the parametric determination can be based on a coverage parameter (246). The coverage parameter can reflect the extent to which a particular element is located in the required locations of the network system 101.

With reference to FIG. 2B, the security architecture and evaluation to determine for the network system (260). The security architecture and evaluation can be determined in accordance with, for example, a method such as described with FIG. 2A.

In one embodiment, a set of elements from the security model are identified as candidates for an upgrade to improve security (270). The determination of which elements to upgrade can include those elements that are deemed from the evaluation of the security architecture to have a security level that is below an acceptable threshold. The acceptable threshold for the security level can be based on the determination of the user, or alternatively by default setting.

More specifically, in determining the candidate set of elements, the valuation can identify those elements of the security architecture that have unacceptable scores for metrics such as effectiveness, coverage or maturity (272). Still further, candidates for enhancement can include those elements that have an unacceptable threshold for an overall protection index (e.g., which can incorporate some or all of the parameters, such as effectiveness, coverage, or maturity). Examples such as provided by FIG. 5A through FIG. 5D illustrate an implementation of the security architecture in which different elements are scored in effectiveness (See FIG. 5A), coverage (see FIG. 5B), and/or maturity (see FIG. 5C), as well as a protection index (see FIG. 5D).

Once the candidate set of elements for enhancements is determined, selection criteria can be determined to identify how corresponding components can be improved in order to improve the security aspect of one or more corresponding elements of the security architecture (280). For example, elements of the security architecture 130 can be improved with use of new and more effective technology, additional components for more coverage, or additional support documentation. With reference to FIG. 1, for example, selection criteria can be programmatically generated as query 151 by the recommendation sub-system 156, and the query 151 can be provided for the library 140 in order to identify components or resources to enhance the security level of the network system 101. In one implementation, a reverse relationship can be utilized to determine, from the elements of the security architecture, other components that may correspond to an actual device, program, protocol or network component. The selection criteria for identifying new components can include parametric criteria for components that can correlate to security aspects of the security architecture, such as effectiveness, coverage and maturity. For example, components can be rated on effectiveness or maturity, and the criteria can seek those components which are best in class or within a given tier.

In determining the selection criteria, some embodiments incorporate cost information (284). For example, a user may specify a cost range for upgrading their network system, and the cost range may provide additional criteria for determining the selection of components, as well as the nature of the enhancement, such as effectiveness, coverage and/or maturity. The cost range can be specified for a particular component or element, or for the system has a whole. Still further, the cost input can be a multi-year budget, in which case, for example, the selection criteria can weigh the replacement of some elements based on maturity.

The security architecture can be updated based on the result from the selection criteria (288). By way of example and with reference to FIG. 1, the result can include system change 159, and the system change 159 can specify new components, existing components that can be duplicated or improved, and/or additional support resources for existing components. The recommendation sub-system 156 can signal query 151 to the library 140 in order to obtain system changes 159 for identifying improvements to enhance the network system 101. The system architecture 130 can be integrated with the system changes 159 in order to create a future or hypothetical copy (designated by "(t=1)") of the prior (current) architecture (designated by "(S=0)"). The system architecture 130 can be subjected to the model determination sub-system 150, which in turn determines elements for the network system components at one or more future states (S=1, 2, . . . n). The updated system architecture 130 at a future state (S=1, 2, . . . n) can correlate the components identified by the recommendation sub-system 156 into elements based on the security model 105.

The system architecture at each of the future states (S=1, 2, . . . n) can be re-evaluated based on the changes and additions to the elements of the security architecture (290). For example, parameters such as effectiveness, coverage and maturity can be re-calculated for some or all of the security architecture at each of the future states (S=1, 2, . . . n) (292). Likewise, an overall protection index can also be re-determined for the security architecture at each of the future states (S=1, 2, . . . n).

Once the security architecture is re-evaluated, an output can be provided to the user (294) to reflect information for enabling the user to determine whether the upgrade is worthwhile. For example, the security architecture at the future state (S=1) can illustrate whether the network system is sufficiently secure with the enhancements, or whether additional enhancements are needed.

By way of example, a visualization of the security architecture can be provided to identify the parameters at future state (S=1). As still another example, visualizations such as depicted by FIG. 5A through FIG. 5D can be displayed to the user with the security architecture shown at future state (S=1). Other information that can be displayed with the security architecture include the cost for implementing the upgrade or change of the identified component (295). For example, the one-time cost, or multi-year cost for implementing the change can be displayed to the user.

The user can repeat a method such as described with FIG. 2B to generate additional versions of the security architecture in order to compare costs, evaluate security enhancements and corresponding risk reductions. For example, the user can compare models which emphasize security over cost to determine whether the reduction in risk makes monetary sense for the network system.

With reference to FIG. 2C, each state of the security architecture (e.g., S=0, 1, 2 . . . n) can directly relate to a monetary value that weights the resulting risk reduction to the network system (296). The monetary value for the risk reduction can be determined based on (i) monetary loss from security breach, and (ii) risk of breach. The amount of the monetary loss may be subjective, such as specified by the user, and can include various forms of damages (e.g., government penalties, consumer liability, loss of goodwill, etc.). The risk of breach may be based directly or indirectly on the protection index or other calculation.

The cost for upgrading the network system to each state of the security architecture can also be determined (298). For example, components that the user can purchase and install on the network system can be priced for purchase (or lease), and further for installation cost and labor. The overall cost for installing new components, upgrading existing components, and/or performing other enhancements to transition the security architecture to a particular state can then be calculated.

A user can make a determination as to whether a particular upgrade is worthwhile by comparing the change in monetary value between a given prospective state and the current state to the cost for upgrading the system to the particular state. Based on the comparison, the determination can be made as to whether the upgrade is worthwhile. Still further, an embodiment provides for multiple comparisons to be determined, and the optimal or best upgrade can be selected to optimize improvement to the security level of the network system based on available resources.

Model Description

FIG. 3A through FIG. 3G illustrate a model in accordance with one or more embodiments. A model such as described by an example of FIGS. 3A through 3G can be used to (i) conduct a security assessment for a networked system, and (ii) provide an updated security assessment for enhancements that can be made to the security architecture 130. Among other benefits, examples such as described with FIG. 1, or FIG. 2 can implement a model such as described with examples of FIG. 3A through FIG. 3G, in order to enable an organization to assess threat exposure, security risk, and implement future security implementations to address threat exposure based on an acceptable level of financial exposure. In particular, an example model such as described with any of FIG. 3A through FIG. 3G can enable an organization to plan security measures for a network system in a manner that balances financial exposure (e.g., cost of lost assets and other damages) to the expected cost for implementing security upgrades that remedy elements of the system which be the cause of an unacceptable level of risk.

Examples such as provided with FIG. 3A through FIG. 3G implement a model that is structured in the form of a multi-dimensional sphere. Each dimension of the sphere can correspond to a layer or sub-sphere. With specific reference to FIG. 3A through FIG. 3C, the model 300 includes a three-dimensional structure, and more specifically, a spherical structure 310, having multiple dimensional spaces. The spherical structure represents an integral whole in a current or prospective security state of a networked system.

According to some embodiments, a model 300 can be implemented as a set of concentric spheres, where each sphere represents a space. An inner space can further be provided by one or more spheres to represent the assets (asset space, "AS") that are to be protected within a network security system. The asset space 312 can include information and hardware assets that need protection. The outer space represents a threat space (TS) 316, identifying cyber-threats that can target and threaten the assets of the inner space 312. In between the asset space 312 and the threat space 316 is an intermediate space, representing the protection space (PS) 314. The protection space 314 includes the components or security capabilities that are employed to protect the assets from cyber threats. Each of the respective spaces can be separately modeled as a sphere, and further provided one or more additional sub-spheres that describe a particular abstraction of the particular defined space.

In one implementation, the sub-spheres of the defined spaces 312-316 can each define a sub-model for a particular abstraction of the defined space. In this way, each sub-sphere can represent a pre-defined categorical aspect of a security consideration for a network system. The modeling of each categorical aspect can further share basic model structures and rules with one another.

Figure 3B:
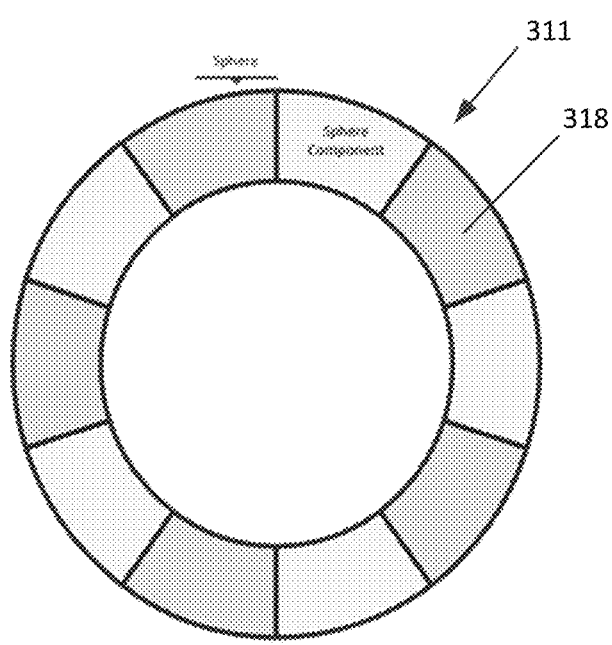
FIG. 3A through FIG. 3G illustrate a model in accordance with one or more embodiments.
Figure 3C:
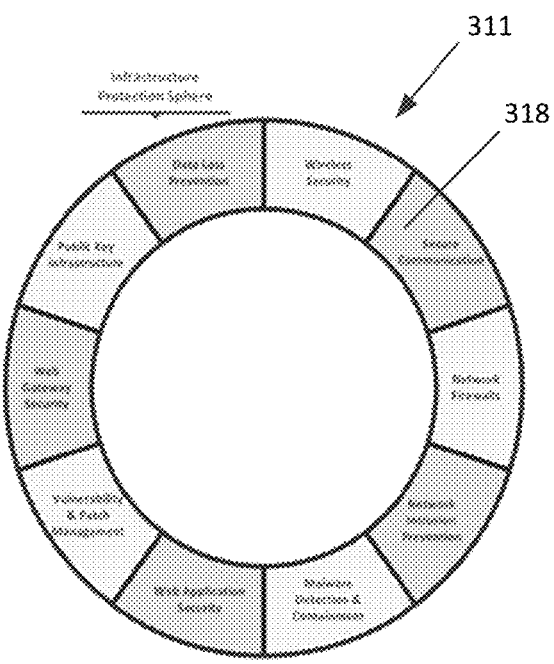
Figure 3A:
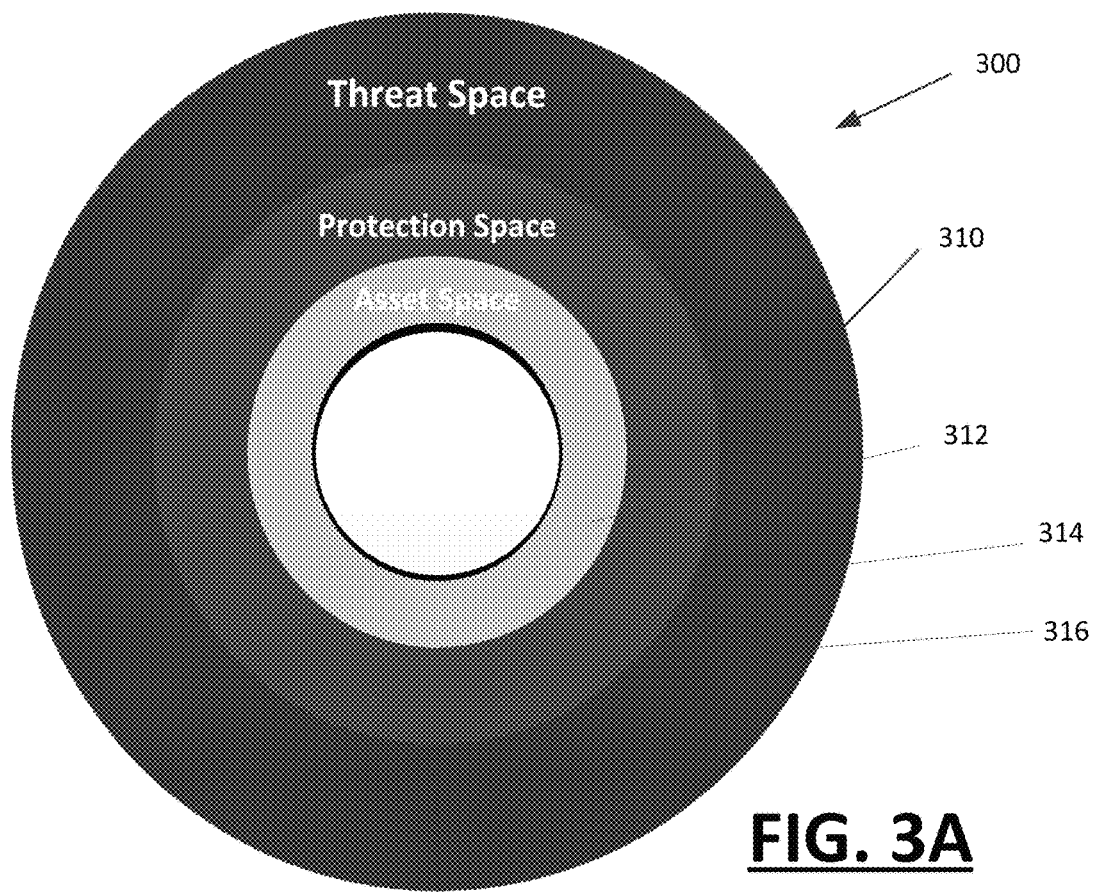

With reference to FIG. 3B and FIG. 3C, the sub-sphere 311 can be representative of any sub-sphere of the model 300. The sub-sphere 311 of each space 312, 314, 316 can be formed from a combination of elements 318. The elements 318 of each sub-sphere can possess defined relationships and associations to one another. Specifically, the elements 318 of each sub-sphere 311 can be directly and indirectly related to each other within the particular sphere. Additionally, the model can define relationships amongst the elements 318 of a particular space (e.g., multiple sub-spheres 311). The relationships can define a set of hierarchical relationships, where each sub-sphere includes n (e.g., 4) degree hierarchical data structure.

In the protection space 314, the elements 318 can represent components of a security system. Thus, in the protection space 314, each element 318 can individually represent a specific security capability, such as a method, mechanism, or device for protecting the network system. The hierarchical relationships provide that the individual components are identified when interconnected by structural and behavioral relationships when made operational.

Figure 3D:
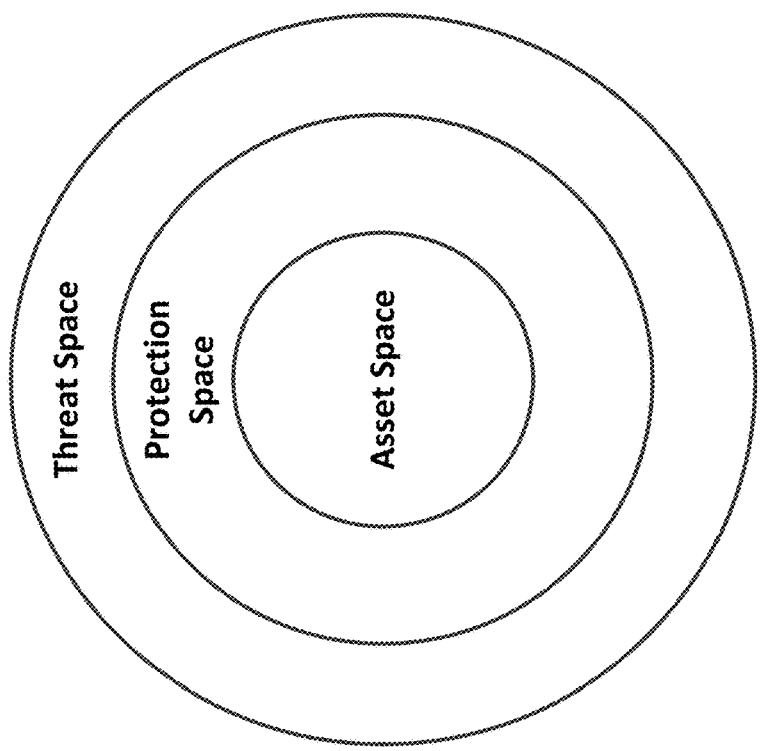

FIG. 3D illustrates examples of element relationships and definitions amongst the asset space and the protection space, according to an embodiment. In particular, examples recognize that spaces 312, 314, 316 can be decomposed into sub-structures and sub-processes to elemental parts and steps. In the model 300, the sub-structures and sub-processes can be represented by levels, as well as elements for each level. By way of example, the hierarchical structure for the protection space 314 can include elements of the following: (i) component level (Level 1) elements, representing component general class of security technology, (ii) sub-component level (Level 2) elements, representing a specific class of security technology within the general class of security technology; (iii) sub-sub component (Level 3) elements, representing a specific technical function operating at the protocol, format, or stack level within the specific class of security technology; and/or (iv) technology security controls (Level 4) elements, representing the actual applied security detective, preventative, or compensating control executed by the security capability. Additionally, the hierarchical structure for the asset space 312 can include (i) hardware asset sphere, comprised of (a) hardware asset type (Level 1), such as a server (Level 1) elements; (b) hardware asset group such as a production server (Level 2) elements, and (c) hardware asset identification of a specific asset (Level 3) elements. Additionally, the hierarchical structure for the asset space 312 can include (ii) information asset sphere comprised of (a) information asset type (Level 1) elements, such as intellectual property; (b) information asset group (Level 2) elements, such as intellectual property related to a particular product; and (iii) information asset identification (Level 3) elements, such as product specifications on the particular product.

In addition to hierarchical relationships, the model 300 can define perspective relationships amongst the elements of the sub-spheres in the spaces 312, 314, 316. With regard to the protection space 314, the perspective relationship can be used to convey specific interrelated information for determining the adequacy of protection given the threat originating from the threat space 316 and the targeted asset residing in the asset space 312. In one implementation, the perspective values at any given level of the protective sphere 314 are inherited from corresponding sub-levels using a pre-determined mathematical calculation such as weighting or process. For example, a Level 1 component may derive perspectives for metrics that correspond to Effectiveness, Coverage and Maturity from the aggregate values of its Level 2 sub-components. In turn, each Level 2 sub-component can derive the perspective values from the aggregate of its Level 3 sub-components. Still further, each Level 3 sub-sub-component may derive its perspective values from the aggregate of its Level 4 (Control) Effectiveness, Coverage, or Maturity values. In this way, the "ECM" (Effectiveness-Coverage-Maturity) perspectives at each individual level of the protection space 314 is integrated to define protection on an interdependent level by level layer.

Additionally, model 300 can also define component relationships, particularly in the protection space 314. A component relationship identifies components that have affinities or commonalities based on the security capabilities of individual components which can be grouped, analyzed holistically, and/or optimized. The components that are deemed to reside in separate spheres may share commonalities in terms of similar or identical security purposes applied to different aspects of the network system. In addition, components or elements that reside on the border of respective spaces can be selected to be adjacent and aligned (e.g., aligned so that a radius from the center of the sphere intersects the respective elements of the different layers). The positioning of the respective elements within a sphere and between spheres conveys meaning, such as identifying aspects of a security solution to protect an asset for purpose of enabling optimization between the respective spaces and layers. By way of example, in the protection space 314, the components can be organized to maximize the protection against a specific element (e.g., threat) of the threat space 312, and more particularly, a specific threat targeting an element of the asset space 312 (e.g., a particular asset). In the example provided, the process can be executed at any of the 4 levels of any of the spheres within the protection space 314. A series of Level 4 controls can be organized across different spheres of the protection space to detect or prevent a specific Level 4 threat attack vector.

Still further, model 300 can define behavioral relationships. Behavioral relationships define relationships that execute behaviors governed by architectural and pre-defined rules. For example, architectural rules may be based on rules of aggregation that govern how Level 4 aggregates into Level 3, Level 3 into Level 2, and/or Level 2 into Level 1 to form a particular sphere. Additionally, architectural rules can be based on rules governing any two components interact in sequence or in parallel to address a specific threat to a specific asset. The behavioral relationships can also define constraints. By way of example, the constraints can specify that components cannot cross spheres or two components do not interact, or alternatively, only interact in specific ways.

In one implementation, the behavioral rules can be defined by logic flows for transforming inputs into outputs. For example, the behavioral rules can specify the rules of interaction between the ECM Perspectives assigned to a common element. The effectiveness, coverage and maturity data is processed using an algorithmic approach that determines a metric, such as a protection index. In addition, Behavioral rules include affinity rules that govern how components can organize on a sphere to form an "Affinity"

security capability. Architectural and behavioral rules can also apply between spheres that define a specific aspect of a security state for a network system. For example, the sphere model can represent a threat space, protection space, and asset space. To continue the example, the components from the sphere of the protection space can align to maximize protection against the components of the threat sphere components, which define the specific nature of a threat towards asset sphere components defined by specific levels of criticality and sensitivity.

Figure 3E:
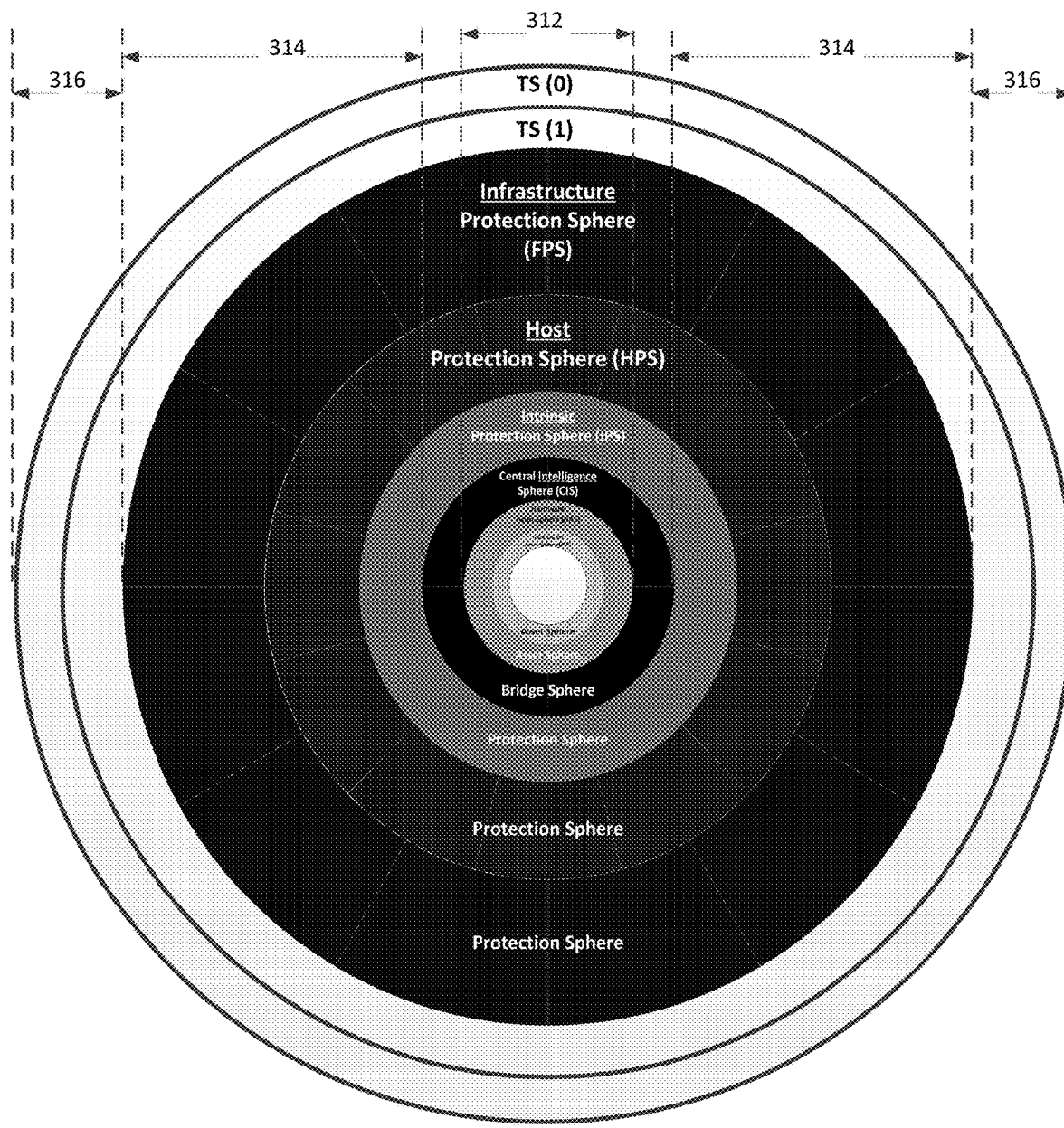

FIG. 3E illustrates another example for model 300, incorporated as a spherical structure. An example of FIG. 3E includes sub-spheres for the asset space 312, the protection space 314 and the threat space 316. Table 1, provided below, is illustrative of the spheres that comprise a given model 300:

security protection technologies and mechanisms (Protection Sphere 3); and (iv) infrastructure protection sphere (InPS), which provides a representation of security technologies that is directed to the infrastructure technologies and mechanisms.

The threat space 316 can include one more spheres, each of which represent a pre-defined categorical aspect of a cyber-threats. In the example of Table 1, the threat space 316 can include (i) a threat vector sphere (TVS), representing possible vectors of attack, techniques, methods for penetration into infrastructure and host systems, access to devices and documents and (ii) a threat intent sphere, representing attacker intent and motives such as cyber-crime, cyber-espionage, cyber-terrorism, cyber-warfare, and cyber-activ- Model Sphere Table 1

| Sphere ID | Space | Sphere Name | Acronym | Description |
|---|---|---|---|---|
| AS-1 | AS | Information Asset Sphere | IAS | A representation of all information assets, their sensitivity and location status, etc. |
| AS-2 | AS | Hardware Asset Sphere | HAS | A representation of all hardware assets, their criticality and configuration status, etc. |
| PS-1 | PS | Central Intelligence Sphere | CIS | A representation of the centralized 1) collection of all threat and attack data, analysis, and response & 2) creation, distribution, and management of GRC policies, etc. |
| PS-2 | PS | Intrinsic Protection Sphere | IPS | A representation focused on intrinsic security protection mechanisms such as encryption and behavioral analysis |
| PS-3 | PS | Host Protection Sphere | HPS | A representation focused on hosts, systems, applications, and end points security protection mechanisms. |
| PS-4 | PS | Infrastructure Protection Sphere | InPS | A representation focused on the network and infrastructure protection mechanisms |
| TS-1 | TS | Threat Vector Sphere | TVS | A representation of possible vectors of attack, techniques, methods for penetration into infrastructure and host systems |
| TS-2 | TS | Threat Intent Sphere | TIS | A representation of the intents and motives of behind the attacks |

As shown by Table 1, the asset space 312 can comprise multiple spheres, each of which represent information or hardware assets. In the example provided, the asset space 312 includes an information asset sphere (IAS), which can represent information assets and their respective sensitivity and business value (Asset Sphere 1). The asset space 312 can also include a hardware asset sphere (HAS), which can represent hardware devices and infrastructure and their criticality and configuration status (Asset Sphere 2).

Likewise, the protection space 314 can be represented by spheres that are organized to represent different classes of security technologies. In the example provided, (i) the central intelligence sphere (CIS), which represents security technologies that perform centralized functions including 1) Governance, Risk, and Compliance policy creation, distribution, and management, 2) correlation analysis and situational awareness and 3) centralized threat data gathering, analysis and response (Protection Sphere 1); (ii) intrinsic protection sphere (IPS), which provides a representation of security technologies focused on intrinsic security protection mechanisms such as encryption and behavioral analysis (Protection Sphere 2); (iii) host protection sphere (HPS), which provides representation of security technologies focused on hosts, systems, applications, and end points ism, and their resources, techniques, methods and capabilities that are driving the attack vectors represented by the TVS.

Figure 3F:
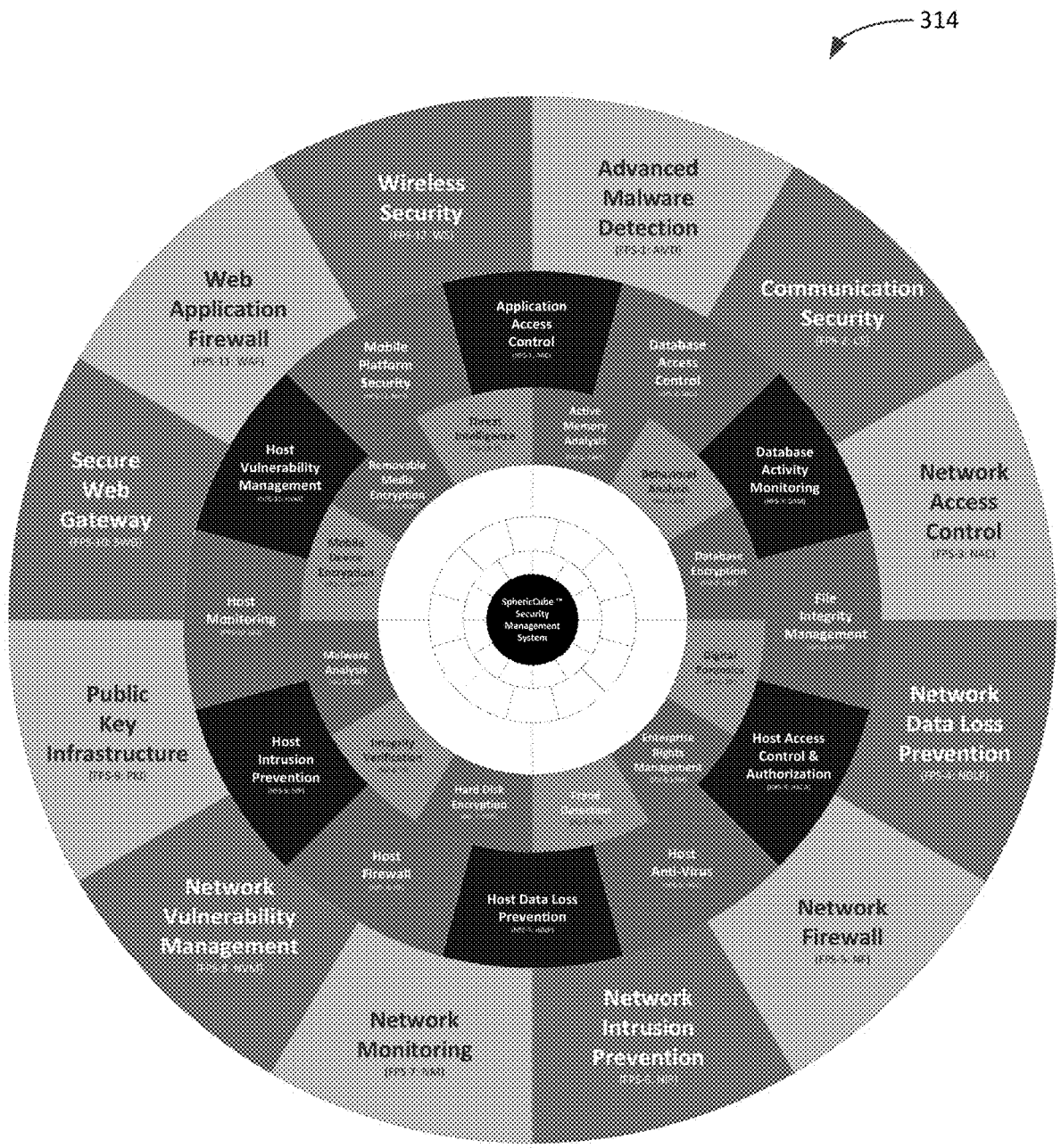

FIG. 3F illustrates an example of a protection space 314. As shown by prior examples, the protection space 314 can be formed from multiple sub-spheres 344, corresponding to CIS, IPS, HPS and InPS. The elements of each sub-sphere can be structured in accordance with a pre-determined layout. Input from the user 5 can be used to provide values for the elements of the sphere, either directly or indirectly (see e.g., FIG. 4). If the network system does not include a component corresponding to one of the elements, then the particular element is provided a value (e.g., "0") indicating a corresponding component is not present in protection space 314. As described further, each sphere within the protection space 314 can be scored based on predetermined security measures, and the scoring (reflecting the degree of protection with each element) for each element can be used to determine an overall protection level of the protection space 314.

Figure 3G:
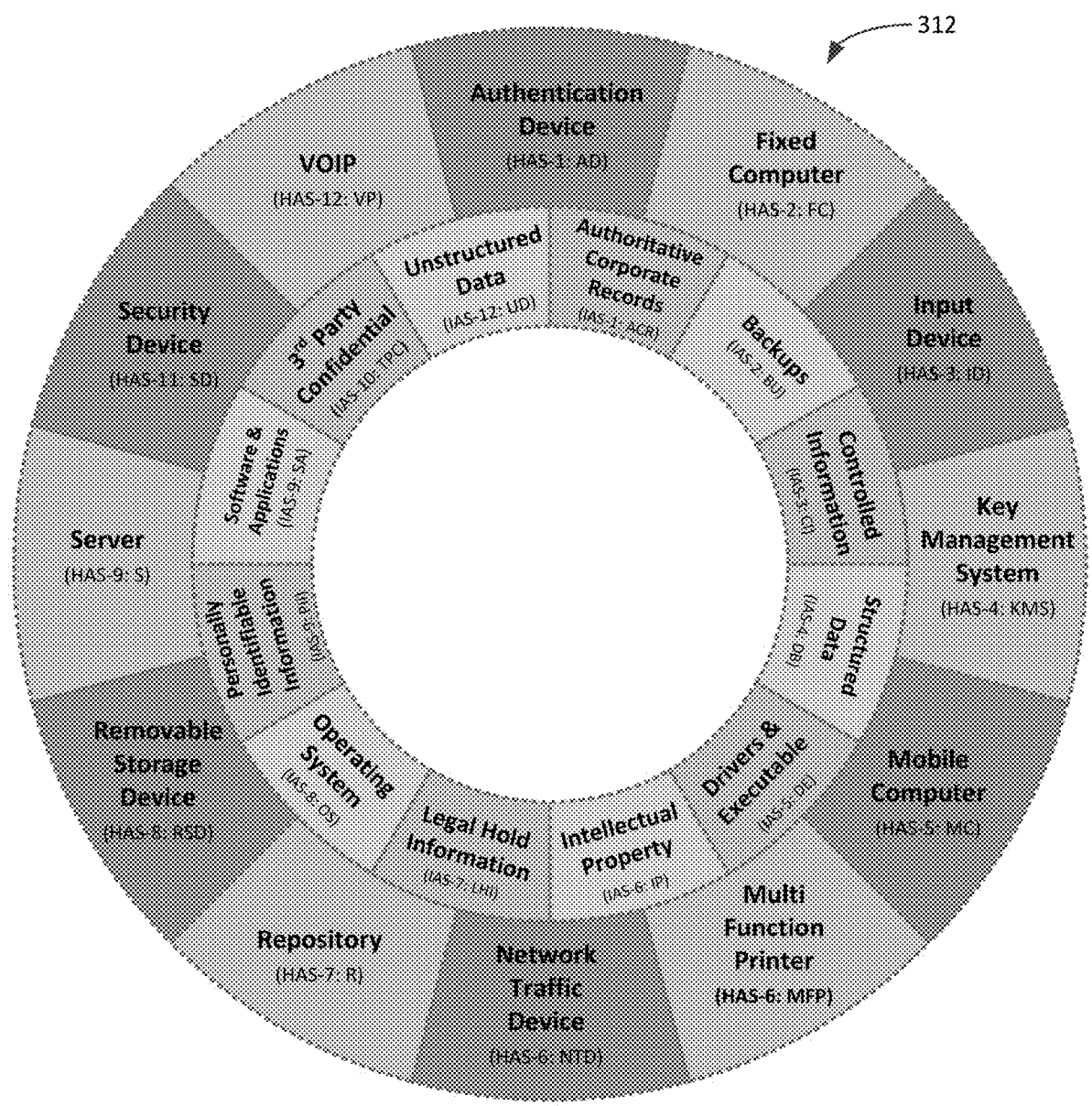

FIG. 3G illustrates an example of an asset space 312. In an example shown, the asset space 312 can include one or more spheres for each of multiple levels that correspond to hardware assets and information assets. As shown with FIG.

3G, the asset space 312 can include (i) hardware asset sphere, comprised of (a) hardware asset type (Level 1), such as a server (Level 1) elements; (b) hardware asset group such as a production server (Level 2) elements, and (c) hardware asset identification of a specific asset (Level 3) elements. Additionally, the hierarchical structure for the asset space 312 can include (ii) information asset sphere comprised of (a) information asset type (Level 1) elements, such as intellectual property; (b) information asset group (Level 2) elements, such as intellectual property related to a particular product; and (iii) information asset identification (Level 3) elements, such as product specifications on the particular product.

Figure 4:
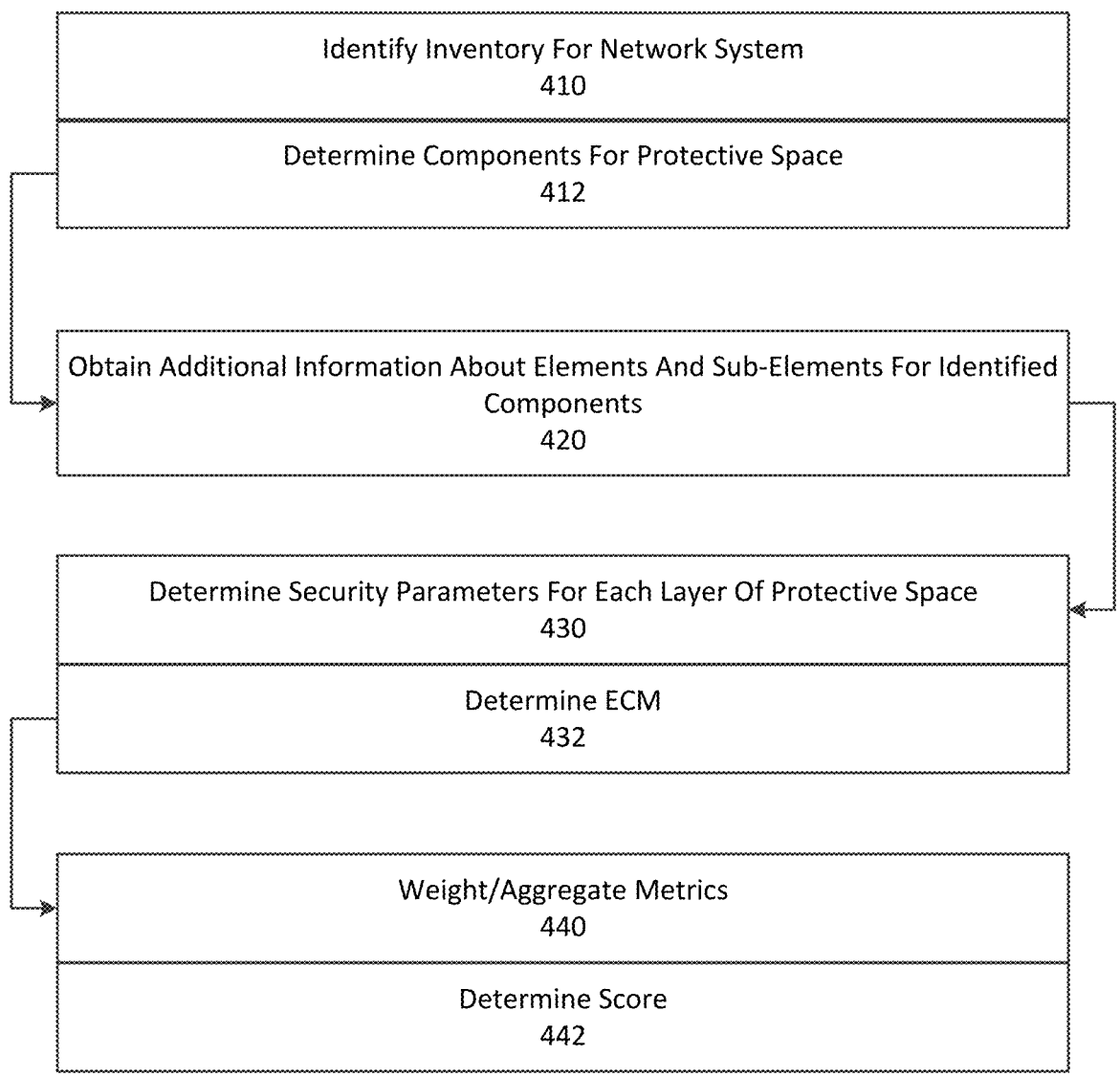
FIG. 4 illustrates a method for developing and implementing the model for use with a network system, according to an embodiment.

FIG. 4 illustrates a method for developing and implementing the model 300 for use with a network system, according to an embodiment. In describing an example of FIG. 4, reference may be made to elements of FIG. 1 or FIG. 3A through FIG. 3E in order to illustrate suitable components or aspects for implementing a step or sub-step being described.

With reference to FIG. 4, the system 100 operates to identify the inventory for the network system (410). In one implementation, the input logic 112 and the user interface 108 combine to provide the user with prompts that guide the user into entering information that identifies the security components of the network system for the protection space 314 (412). For example, the prompts can direct the user to answer specific questions, and based on the user response, additional questions or prompts can be provided. The accumulation of the inputs can direct the user to enter input by, for example, manufacturer or vendor, or by other descriptive information (e.g., type or category of device, year of purchase, whether purchase was new or used). With reference to an example of FIG. 3D, the inputs entered by the user can correspond to values for any one or more of Level 1, Level 2, Level 3, or Level 4 elements.

Based on the components identified by the user input, additional information about those components and their respective sub-elements (e.g., Level 2, 3, or 4 elements) can be obtained (420). By way of example, user input can specify the presence of "public key infrastructure (PKI)," which correlates to a Level 1 element for the security architecture 130. With that information, the model determination sub-system 150, for example, can determine information (e.g., values, configurations) about the specifics of the sub-elements for "PKI", such as "Registration Authority," "Certificate Authority," "Key Management System" and "Sole Control." The information about the specifics of the sub-system can be determined from, for example, the library 140 and/or external sources.

One or more parameters are also determined for each of the elements that comprise the individual spheres of the protection space 314 (430). The parameters can be determined directly or indirectly from user-input. For example, the user can specify a particular parameter, or logic (e.g., parametric determination sub-system 128) can infer a parameter value based on a user's prior input (e.g., based on a user input identifying a component, or a parametric value provided by the user). Alternatively, some or all of the parameters can be pre-determined, assuming information about the state of the security architecture 130 is adequately known. As an alternative or variation, some or all of the parameters can be determined in part or in whole through a programmatically implemented measuring process. Still further, in some variations, the parametric input of the user can be validated through measurements made by a programmatic process. In one implementation, the parameters can correspond to parameters for the components of the security system. The parameters can correspond to effectiveness (E), coverage (C) and maturity (M) (432). In one implementation, the parameters can be determined for individual elements (e.g., as determined for components by manufacturer and vendor) and stored for subsequent use. With reference to FIG. 1, the ECM parameters can be stored in the repository sub-system 152. Table 2 provides provides an example of a Level 2 data structure that can be developed for a network environment upon determining parameters (e.g., ECM).

| Sphere/Ring i | Level 1 Component j | Level 2 Sub-Component k | Effectiveness ($E2_{ijk}$) | Coverage ($C2_{ijk}$) | Maturity ($M2_{ijk}$) |
|---|---|---|---|---|---|
| 1 | 1 | 1 | $E2_{111}$ | $C2_{111}$ | $M2_{111}$ |
| 1 | 1 | 2 | $E2_{112}$ | $C2_{112}$ | $M2_{112}$ |
| 1 | 1 | 3 | $E2_{113}$ | $C2_{113}$ | $M2_{113}$ |
| 1 | 1 | 4 | $E2_{114}$ | $C2_{114}$ | $M2_{114}$ |
| 1 | 1 | 5 | $E2_{115}$ | $C2_{115}$ | $M2_{115}$ |
| 1 | 2 | 1 | $E2_{121}$ | $C2_{121}$ | $M2_{122}$ |
| 1 | 2 | 2 | $E2_{122}$ | $C2_{122}$ | $M2_{122}$ |
| 1 | 2 | 3 | $E2_{123}$ | $C2_{123}$ | $M2_{123}$ |
| 1 | 2 | 4 | $E2_{124}$ | $C2_{124}$ | $M2_{124}$ |
| 1 | 2 | 5 | $E2_{125}$ | $C2_{125}$ | $M2_{125}$ |
| 1 | 3 | 1 | $E2_{131}$ | $C2_{131}$ | $M2_{131}$ |
| 4 | j | 1 | $E2_{4j1}$ | $C2_{4j1}$ | $M2_{4j1}$ |
| 4 | j | 2 | $E2_{4j2}$ | $C2_{4j2}$ | $M2_{4j2}$ |
| 4 | j | 3 | $E2_{4j3}$ | $C2_{4j3}$ | $M2_{4j3}$ |
| 4 | j | 4 | $E2_{4j4}$ | $C2_{4j4}$ | $M2_{4j4}$ |
| 4 | j | 5 | $E2_{4j5}$ | $C2_{4j5}$ | $M2_{j35}$ |

The parameters can be processed by mathematical formulas such as weighted average and aggregation (440). The specific formulation for aggregating the parameters can be based on design implementation.

In one implementation, the measure of component (Level 1) effectiveness E1 for elements "j" of the protection sphere "i" of the protection space 314 can be determined by the following weighted average equation operating over all sub-components "k" of component "j":

$$E1_{ij} = [(\Sigma_1{}^k \epsilon^E{}_{ijk} E2_{ijk})_{ij} / (\Sigma_1{}^k \epsilon^E{}_{ijk})] \qquad \text{(Equation 1)}$$

Likewise, the measure of component (Level 1) coverage C1 for elements "j" of the protection sphere "i" of the protection space 314 can be determined by the following weighted average equation operating over all sub-components "k" of component "j":

$$C1_{ij} = [(\Sigma_1{}^k \epsilon^C{}_{ijk} C2_{ijk})_{ij} / (\Sigma_1{}^k \epsilon^C{}_{ijk})] \qquad \text{(Equation 2)}$$

Likewise, the measure of component (Level 1) maturity M1 for elements "j" of the protection sphere "i" of the protection space 314 can be determined by the following weighted average equation operating over all sub-components "k" of component "j":

$$M1_{ij} = [(\Sigma_1{}^k \epsilon^M{}_{ijk} M2_{ijk})_{ij} / (\Sigma_1{}^k \epsilon^M{}_{ijk})] \qquad \text{(Equation 3)}$$

A score can be determined from the parameters (342). In one implementation, the score (protection index) can be determined from the following equation:

$$PI_{ij} = [\epsilon^E{}_{ij} E1_{ij}] * [\epsilon^C{}_{ij} C1_{ij}] * [\epsilon^M{}_{ij} M1_{ij}] \qquad \text{(Equation 4)}$$

Each of Equation (1), (2), (3) and (4) incorporate coefficients (e.g., $\epsilon^E \epsilon^C \epsilon^M$) that operate on the measured (or estimated) values. According to one aspect, the coefficients can be designated default values and optionally tuned by the user. By way of example, the value of the default coefficients can be set to (1) under default when a particular element is present, and to (0) when the particular element is not present. The user can tune the coefficients in order to tune the response of the system 100 to better simulate the user's network system in a current or future state. By way of example and with reference to FIG. 1, the user can operate the tuning interface 118 in order to set the coefficients in a manner that more accurately reflects the actual environment of the user's network system. The coefficients can be implemented at every level of the security architecture 130 (e.g., Level 1, 2, 3, and 4 of the protective space 314).

The coefficients generate weighted values for parameters such as effectiveness, coverage and maturity at given levels (e.g., Level 1, 2, 3, or 4). These weighted values of the parameters can be aggregated upwards (e.g., from Level 4 to Level 3), so that a Level n (e.g., Level 1) parameter value can be achieved through an aggregation of that elements' sub-elements (e.g., Level 2). The aggregation of the values can incorporate parameter values that are weighted using coefficients provided by, for example, the user. This aggregation process provides the ability to tune how the security architecture 130 responds to the parameter values entered by the user or measured.

Aggregation can also be implemented along a sphere (or ring) based on aggregation of all its elements. Thus, the parameter value (e.g., effectiveness score 131) for a Level 1 element can be aggregated from that element's sub-elements (e.g., Level 2, which can be aggregated from its Level 3 sub-components), and an overall parameter score (effectiveness) for a sphere can be aggregated from the parameter score of each element of that sphere (e.g., aggregate effective score for all Level 1 elements). By way of a Level 2 example, the mathematical representation of the effectiveness sphere aggregate indicator can be represented by:

$$RE_i = \Sigma_1^j \mathcal{C}^E_{ij} E1_{ij} / \Sigma_1^j \mathcal{C}^E_{ij} \quad \text{Equation (5)}$$

where $\mathcal{C}^E$ is a effectiveness sphere aggregation coefficient used to create a weighted average of the sphere.

As $$E1_{ij} = [(\Sigma_1^k \mathcal{C}^E_{ijk} E2_{ijk})_{ij} / (\Sigma_1^k \mathcal{C}^E_{ijk})] \quad \text{Equation (6)}$$

Then Equation (6) in expanded form can be represented as:

$$RE_i = \Sigma_1^j \mathcal{C}^E_{ij} [(\Sigma_1^k \mathcal{C}^E_{ijk} E2_{ijk})_{ij} / (\Sigma_1^k \mathcal{C}^E_{ijk})] / \Sigma_1^j \mathcal{C}^E_{ij} \quad \text{Equation (7)}$$

Similarly, as a Level 2 example, the mathematical representation of the coverage sphere aggregate indicator can be represented by:

$$RC_i = \Sigma_1^j \mathcal{C}^C_{ij} [(\Sigma_1^k \mathcal{C}^C_{ijk} C2_{ijk})_{ij} / (\Sigma_1^k \mathcal{C}^C_{ijk})] / \Sigma_1^j \mathcal{C}^C_{ij} \quad \text{Equation (8)}$$

where $\mathcal{C}^C$ is a coverage sphere aggregation coefficient used to create a weighted average of the sphere.

Likewise, as a Level 2 example, the mathematical representation of the coverage sphere aggregate indicator can be represented by:

$$RM_i = \Sigma_1^j \mathcal{C}^M_{ij} [(\Sigma_1^k \mathcal{C}^M_{ijk} M2_{ijk})_{ij} / (\Sigma_1^k \mathcal{C}^M_{ijk})] / \Sigma_1^j \mathcal{C}^M_{ij} \quad \text{Equation (9)}$$

where $\mathcal{C}^M$ is a maturity sphere aggregation coefficient used to create a weighted average of the sphere.

FIG. 5A through FIG. 5D illustrate examples of security spheres as scored for a particular metric or set of metrics. In particular, FIG. 5A through FIG. 5D illustrate security spheres that are implementations of the model 300, with scoring provided by a particular security metric or set of metrics, as described with an example of FIG. 4. With reference to FIG. 1, the security spheres and respective scoring can be generated through use of the evaluation sub-system 148.

Figures 5A, 5B, 5C:
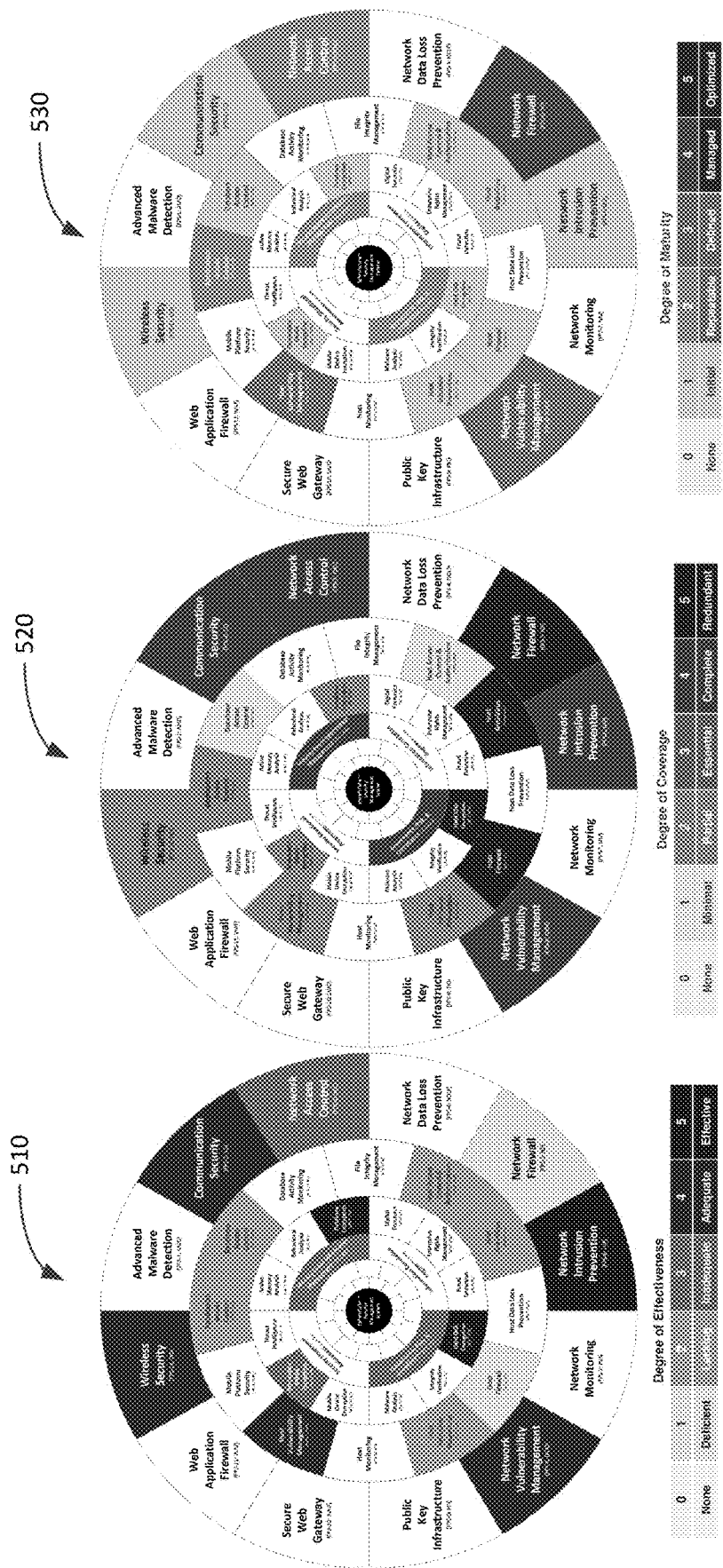
FIG. 5A through FIG. 5D illustrate examples of security spheres as scored for a particular metric or set of metrics.

In FIG. 5A, a security shield 510 reflects a determination of effectiveness for each element of each of the spheres of the protection space 314. The effectiveness (E1) can be determined from, for example, Equation (1). By way of example, the score for each element can range from a minimum to a maximum (0 to 5). The security shield 510 can be visualized to reflect coloring or shading that reflects an effectiveness score.

In FIG. 5B, a security shield 520 reflects a determination of coverage for each element of the security sphere in the protection space 314. The coverage (C1) can be determined from, for example, Equation (2). As with other parameters, the score for each element can range from a minimum to a maximum (0 to 5). Additionally, the security sphere 510 can be visualized to reflect coloring or shading that reflects an effectiveness score.

In FIG. 5C, a security shield 530 reflects a determination of maturity for each element of the security sphere. The maturity (M1) can be determined from, for example, Equation (3). As with other parameters, the score for each element can range from a minimum to a maximum (0 to 5). Additionally, the security shield 510 can be visualized to reflect coloring or shading that reflects a maturity score, with the highest score reflecting the element that is least mature.

As an alternative or variation, the security shield 510 can be displayed as a single value, such as for a particular parameter (effectiveness, coverage, maturity) using for example, equations for the effectiveness sphere aggregate indicator (Equation 7), coverage sphere aggregate indicator (Equation 8), and maturity sphere aggregate indicator (Equation 9).

Figure 5D:
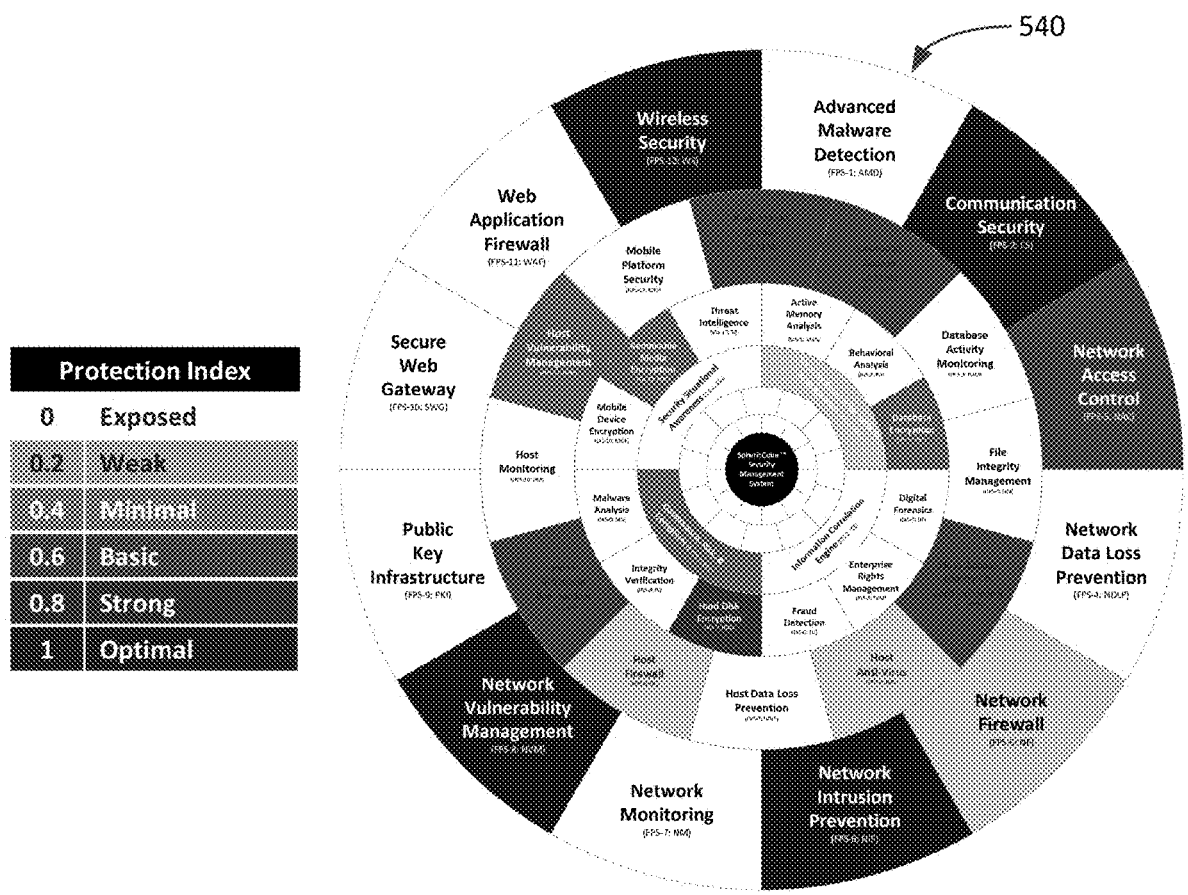

In FIG. 5D, a security shield 530 reflects a protection index (PI), reflecting an overall integrated security score for each element of a network system. The protection index (PI) can be determined from, for example, Equation (4). The PI can also be reflected as a normalized score that ranges between a minimum to a maximum (0 to 1). Additionally, the security shield 540 can be visualized to reflect coloring or shading that reflects the PI.

Computer System

Figure 6:
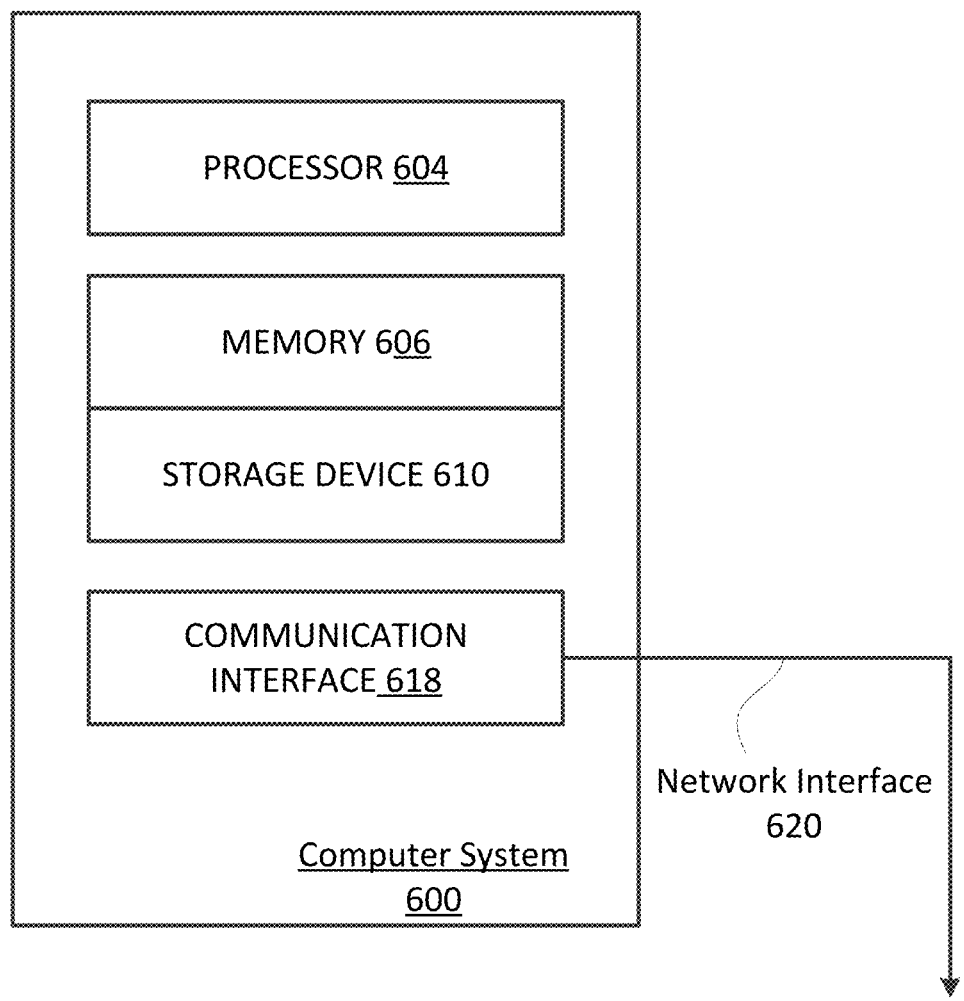
FIG. 6 is a block diagram that illustrates a computer system upon which embodiments described herein may be implemented.

FIG. 6 is a block diagram that illustrates a computer system upon which embodiments described herein may be implemented. For example, a system such as described with FIG. 1 can be implemented on a computer system such as described with an example of FIG. 6. Likewise, method such as described with an example of FIG. 2A, 2B, 2C or FIG. 4 can also be implemented using a computer system such as described with FIG. 6.

In an embodiment, computer system 600 includes processor 604, memory 606 (including non-transitory memory), storage device 610, and communication interface 618. Computer system 600 includes at least one processor 604 for processing information. The memory can include a main memory 606, such as a random access memory (RAM) or other dynamic storage device, for storing information and instructions to be executed by processor 604. The memory 606 also may be used for storing temporary variables or other intermediate information during execution of instructions to be executed by processor 604. Computer system 600 may also include a read only memory (ROM) or other static storage device for storing static information and instructions for processor 604. A storage device 610, such as a magnetic disk or optical disk, is provided for storing information and instructions. The communication interface 618 may enable the computer system 600 to communicate with one or more networks through use of the network link 620 (wireless or wireline).

In one implementation, memory 606 may store instructions for implementing functionality such as described with an example system of FIG. 1, or implemented through an example method such as described with FIG. 2A, FIG. 2B, FIG. 2C or FIG. 4. Likewise, the processor 604 may execute the instructions in providing functionality as described with a system such as described with FIG. 1, or still further, with methods such as described with FIG. 2A, FIG. 2B, FIG. 2C or FIG. 4.

Embodiments described herein are related to the use of computer system 600 for implementing the techniques described herein. According to one embodiment, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computer system comprising:
   a combination of memory that stores:
      a library of elements for a security model, each element of the element library being defined by at least a data set type and a function, and each element of the element library including a relationship with one or more other elements of the security model;
      a library of products, the product library storing information about a plurality of commercially available products, each product of the product library being deemed pertinent to a respective data set type and a respective function;
      wherein each product of the product library is associated with one or more metrics that relate to at least one of a security aspect, an effectiveness aspect, a maturity aspect, or a cost aspect of the security model;
   one or more processors to execute a set of instructions to:
      receive input from a user, the input identifying a set of products that are deployed with a network computer system;
      correlates the set of deployed products to a set of elements of the element library;
      determine an evaluation for the network computer system with respect to the one or more security aspects, the evaluation being based on the set of elements and the one or more metrics that are associated with the set of deployed products;
      generate a representation that reflects (i) the security model as applied to the network computer system, and (ii) the evaluation for the network computer system;
      provide a recommendation to the user to improve the evaluation;
   wherein the one or more processors generate the representation to have multiple dimensions, with each dimension representing at least one of multiple aspects of the security model; and
   wherein the relationships of the element library include a predefined set of hierarchical relationships in which individual levels of the set of hierarchical relationships correlating to a dimension of the multiple dimensions.

2. The computer system of claim 1, wherein each element in the library of elements includes a definition that decomposes the security model into one or more substructures and/or hierarchies.

3. The computer system of claim 1, wherein the one or more processors generate the representation by generating a concentric visualization of the security model as applied to the network computer system as a whole.

4. The computer system of claim 1, wherein the one or more processors generate the representation by generating a spherical visualization of the security model as applied to the network computer system as a whole.

5. The computer system of claim 1, wherein the relationships of the element library include a predefined set of hierarchical relationships in which individual levels of the set of hierarchical relationships correlating to a dimension of the multiple dimensions.

6. The computer system of claim 1, wherein at least some elements of the security model are defined for functions relating to a set of governance risk and compliance policies.

7. The computer system of claim 1, wherein the one or more processors reflect the recommendation in the generated representation.

8. The computer system of claim 1, wherein the one or more processors provide the recommendation by identifying elements of the security model which are inadequate based on one or more metrics of one or more products of the network computer system that correlate to the identified elements.

9. The computer system of claim 8, wherein the one or more processors generate the representation to visually indicate the identified elements of the security model which are inadequate in relation to the security model.

10. The computer system of claim 1, wherein the recommendation identifies a cost for implementing the recommended upgrade.

11. A method for evaluating a network computer system, the method being implemented by one or more processors and comprising:
   accessing a library of elements for a security model, each element of the element library being defined by at least a data set type and a function, and each element of the element library including a relationship with one or more other elements of the security model;
   accessing a library of products, the product library storing information about a plurality of commercially available products, each product of the product library being deemed pertinent to a respective data set type and a respective function;
   wherein each product of the product library is associated with one or more metrics that relate to at least one of a security aspect, an effectiveness aspect, a maturity aspect, or a cost aspect of the security model;
   receiving input from a user, the input identifying a set of products that are deployed with the network computer system;

correlating the set of deployed products to a set of elements of the element library;

determining an evaluation for the network computer system with respect to the one or more security aspects, the evaluation being based on the set of elements and the one or more metrics that are associated with the set of deployed products;

generating a representation that reflects (i) the security model as applied to the network computer system, and (ii) the evaluation for the network computer system; and providing a recommendation to the user to improve the evaluation;

wherein generating the representation includes generating the representation to have multiple dimensions, with each dimension representing at least one of multiple aspects of the security model; and wherein the relationships of the element library include a predefined set of hierarchical relationships in which individual levels of the set of hierarchical relationships correlating to a dimension of the multiple dimensions.

12. The method of claim 11, further comprising:
reflecting the recommendation in the generated representation.

13. The method of claim 11, wherein providing the recommendation includes identifying elements of the security model which are inadequate based on one or more metrics of one or more products of the network computer system that correlate to the identified elements.

14. The method of claim 13, wherein generating the representation includes visually indicating the identified elements of the security model which are inadequate in relation to the security model.

15. The method of claim 14, wherein the recommendation identifies a cost for implementing the recommended upgrade.

16. The method of claim 11, wherein generating the representation includes generating a spherical visualization of the security model as applied to the network computer system as a whole.

17. A non-transitory computer readable medium that stores instructions, which when executed by one or more processors of a computer system, cause the computer system to perform operations that include:

accessing a library of elements for a security model, each element of the element library being defined by at least a data set type and a function, and each element of the element library including a relationship with one or more other elements of the security model;

accessing a library of products, the product library storing information about a plurality of commercially available products, each product of the product library being deemed pertinent to a respective data set type and a respective function;

wherein each product of the product library is associated with one or more metrics that relate to at least one of a security aspect, an effectiveness aspect, a maturity aspect, or a cost aspect of the security model;

receiving input from a user, the input identifying a set of products that are deployed with the network computer system;

correlating the set of deployed products to a set of elements of the element library;

determining an evaluation for the network computer system with respect to the one or more security aspects, the evaluation being based on the set of elements and the one or more metrics that are associated with the set of deployed products;

generating a representation that reflects (i) the security model as applied to the network computer system, and (ii) the evaluation for the network computer system; and providing a recommendation to the user to improve the evaluation;

wherein generating the representation includes generating the representation to have multiple dimensions, with each dimension representing at least one of multiple aspects of the security model; and wherein the relationships of the element library include a predefined set of hierarchical relationships in which individual levels of the set of hierarchical relationships correlating to a dimension of the multiple dimensions;

wherein generating the representation includes generating the representation to have multiple dimensions, with each dimension representing at least one of multiple aspects of the security model; and wherein the relationships of the element library include a predefined set of hierarchical relationships in which individual levels of the set of hierarchical relationships correlating to a dimension of the multiple dimensions.

* * * * *